US012591405B2

(12) United States Patent
Smith et al.

(10) Patent No.: US 12,591,405 B2
(45) Date of Patent: *Mar. 31, 2026

(54) SHARED CONTROL OF A VIRTUAL OBJECT BY MULTIPLE DEVICES

(71) Applicant: Snap Inc., Santa Monica, CA (US)

(72) Inventors: Brian Anthony Smith, Brentwood, NY (US); Rajan Vaish, Beverly Hills, CA (US)

(73) Assignee: Snap Inc., Santa Monica, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 18/477,130

(22) Filed: Sep. 28, 2023

(65) Prior Publication Data

US 2024/0036805 A1     Feb. 1, 2024

Related U.S. Application Data

(63) Continuation of application No. 17/703,567, filed on Mar. 24, 2022, now Pat. No. 11,829,679, which is a
(Continued)

(51) Int. Cl.
| | |
|---|---|
| *G06F 3/14* | (2006.01) |
| *G06T 19/00* | (2011.01) |
| *G06T 19/20* | (2011.01) |

(52) U.S. Cl.
CPC .......... *G06F 3/1454* (2013.01); *G06T 19/006* (2013.01); *G06T 19/20* (2013.01);
(Continued)

(58) Field of Classification Search
CPC ............................. G06T 19/006; G06T 19/20
See application file for complete search history.

(56) References Cited

U.S. PATENT DOCUMENTS

| | | |
|---|---|---|
| 10,353,532 B1 | 7/2019 | Holz et al. |
| 10,897,564 B1 | 1/2021 | Smith et al. |

(Continued)

FOREIGN PATENT DOCUMENTS

| | | |
|---|---|---|
| CN | 101256597 A | 9/2008 |
| CN | 101518148 A | 8/2009 |

(Continued)

OTHER PUBLICATIONS

"U.S. Appl. No. 16/443,614, Non Final Office Action mailed Jun. 2, 2020", 7 pgs.

(Continued)

*Primary Examiner* — Charles Tseng
(74) *Attorney, Agent, or Firm* — Schwegman Lundberg & Woessner, P.A.

(57) ABSTRACT

Aspects of the present disclosure involve a system comprising a computer-readable storage medium storing at least one program, method, and user interface to facilitate a shared control of a virtual object by two or more users. A virtual object is displayed by a first device, for example, as part of an augmented reality experience where the display of the object is overlaid on a real-world environment. User input indicative of a modification to the virtual object is received. The virtual object is modified, and a modified virtual object is displayed by a second device.

20 Claims, 13 Drawing Sheets

Related U.S. Application Data continuation of application No. 16/947,083, filed on Jul. 17, 2020, now Pat. No. 11,340,857.

(60) Provisional application No. 62/876,361, filed on Jul. 19, 2019.

(52) U.S. Cl.
CPC .... *G06T 2200/24* (2013.01); *G06T 2219/024* (2013.01); *G06T 2219/2012* (2013.01); *G06T 2219/2016* (2013.01); *G06T 2219/2021* (2013.01)

(56) References Cited

U.S. PATENT DOCUMENTS

| | | | |
|---|---|---|---|
| 11,064,113 B1 | 7/2021 | Weber et al. | |
| 11,290,632 B2 | 3/2022 | Smith et al. | |
| 11,340,857 B1 | 5/2022 | Smith et al. | |
| 11,593,997 B2 | 2/2023 | Smith et al. | |
| 11,606,491 B2 | 3/2023 | Smith et al. | |
| 11,829,679 B2 | 11/2023 | Smith et al. | |
| 11,856,288 B2 | 12/2023 | Smith et al. | |
| 11,985,175 B2 | 5/2024 | Smith et al. | |
| 12,101,360 B2 | 9/2024 | Smith et al. | |
| 12,182,903 B2 | 12/2024 | Smith et al. | |
| 12,211,156 B2 | 1/2025 | Smith et al. | |
| 2006/0170652 A1* | 8/2006 | Bannai | G06F 3/011 |
| | | | 345/156 |
| 2007/0024527 A1 | 2/2007 | Heikkinen et al. | |
| 2008/0034040 A1 | 2/2008 | Wherry et al. | |
| 2009/0237328 A1 | 9/2009 | Gyorfi et al. | |
| 2011/0161507 A1 | 6/2011 | Osullivan et al. | |
| 2012/0081393 A1 | 4/2012 | Kim | |
| 2012/0198531 A1 | 8/2012 | Ort et al. | |
| 2012/0249741 A1 | 10/2012 | Maciocci et al. | |
| 2013/0178257 A1* | 7/2013 | Langseth | A63F 13/23 |
| | | | 345/419 |
| 2013/0293468 A1* | 11/2013 | Perez | G06F 3/033 |
| | | | 345/158 |
| 2014/0043426 A1 | 2/2014 | Bicanic et al. | |
| 2014/0132630 A1 | 5/2014 | Mun et al. | |
| 2014/0372540 A1 | 12/2014 | Libin | |
| 2015/0235267 A1 | 8/2015 | Steube et al. | |
| 2016/0066036 A1 | 3/2016 | Felt et al. | |
| 2016/0100034 A1 | 4/2016 | Miller | |
| 2016/0133230 A1 | 5/2016 | Daniels et al. | |
| 2016/0142629 A1 | 5/2016 | Jung et al. | |
| 2016/0217623 A1 | 7/2016 | Singh | |
| 2016/0260256 A1 | 9/2016 | Shefi | |
| 2017/0021273 A1 | 1/2017 | Rios | |
| 2017/0160815 A1 | 6/2017 | Glazier et al. | |
| 2017/0352187 A1 | 12/2017 | Haines | |
| 2018/0205797 A1 | 7/2018 | Faulkner | |
| 2018/0295271 A1 | 10/2018 | Kim | |
| 2018/0322706 A1 | 11/2018 | Drouin et al. | |
| 2019/0068390 A1 | 2/2019 | Gross et al. | |
| 2019/0107990 A1 | 4/2019 | Spivack et al. | |
| 2019/0108907 A1 | 4/2019 | Kadri et al. | |
| 2019/0318540 A1 | 10/2019 | Piemonte et al. | |
| 2019/0391724 A1 | 12/2019 | Holz et al. | |
| 2020/0045519 A1 | 2/2020 | Raleigh et al. | |
| 2020/0186576 A1 | 6/2020 | Gopal et al. | |
| 2020/0244711 A1 | 7/2020 | Engel et al. | |
| 2020/0371673 A1 | 11/2020 | Faulkner | |
| 2021/0105397 A1 | 4/2021 | Smith et al. | |
| 2021/0304450 A1 | 9/2021 | Smith et al. | |
| 2021/0304507 A1 | 9/2021 | Smith et al. | |
| 2021/0306386 A1 | 9/2021 | Smith et al. | |
| 2021/0306387 A1 | 9/2021 | Smith et al. | |
| 2022/0182530 A1 | 6/2022 | Smith et al. | |
| 2022/0214856 A1 | 7/2022 | Smith et al. | |
| 2023/0177786 A1 | 6/2023 | Smith et al. | |
| 2023/0188837 A1 | 6/2023 | Smith et al. | |
| 2024/0031674 A1 | 1/2024 | Smith et al. | |
| 2024/0195848 A1 | 6/2024 | Smith et al. | |
| 2024/0333778 A1 | 10/2024 | Smith et al. | |
| 2025/0118035 A1 | 4/2025 | Smith et al. | |

FOREIGN PATENT DOCUMENTS

| | | |
|---|---|---|
| CN | 108734784 A | 11/2018 |
| CN | 108881784 A | 11/2018 |
| CN | 108886523 A | 11/2018 |
| CN | 109391851 A | 2/2019 |
| CN | 109891365 A | 6/2019 |
| CN | 110083227 A | 8/2019 |
| CN | 115668102 A | 1/2023 |
| CN | 115668891 A | 1/2023 |
| CN | 115668897 A | 1/2023 |
| CN | 115698908 A | 2/2023 |
| KR | 102515040 B1 | 3/2023 |
| KR | 102719300 B1 | 10/2024 |
| KR | 102800720 B1 | 4/2025 |
| KR | 102849501 B1 | 8/2025 |
| KR | 102855349 B1 | 9/2025 |
| WO | WO-2008011233 A3 | 6/2008 |
| WO | WO-2016103115 A1 | 6/2016 |
| WO | WO-2019055703 A2 | 3/2019 |
| WO | WO-2021195100 A1 | 9/2021 |
| WO | WO-2021195125 A1 | 9/2021 |
| WO | WO-2021195233 A1 | 9/2021 |
| WO | WO-2021202241 A1 | 10/2021 |

OTHER PUBLICATIONS

"U.S. Appl. No. 16/443,614, Notice of Allowance mailed Sep. 14, 2020", 8 pgs.

"U.S. Appl. No. 16/443,614, Notice of Allowance mailed Sep. 23, 2020", 5 pgs.

"U.S. Appl. No. 16/443,614, Response filed Aug. 24, 2020 to Non Final Office Action mailed Jun. 2, 2020", 9 pgs.

"U.S. Appl. No. 16/947,083, 312 Amendment filed Apr. 14, 2022", 7 pgs.

"U.S. Appl. No. 16/947,083, Corrected Notice of Allowability mailed Apr. 26, 2022", 3 pgs.

"U.S. Appl. No. 16/947,083, Examiner Interview Summary mailed Nov. 8, 2021", 2 pgs.

"U.S. Appl. No. 16/947,083, Final Office Action mailed Aug. 6, 2021", 29 pgs.

"U.S. Appl. No. 16/947,083, Non Final Office Action mailed Mar. 19, 2021", 26 pgs.

"U.S. Appl. No. 16/947,083, Notice of Allowance mailed Jan. 21, 2022", 12 pgs.

"U.S. Appl. No. 16/947,083, Response filed Jul. 13, 2021 to Non Final Office Action mailed Mar. 19, 2021", 11 pgs.

"U.S. Appl. No. 16/947,083, Response filed Nov. 8, 2021 to Final Office Action mailed Aug. 6, 2021", 12 pgs.

"U.S. Appl. No. 17/125,298, Non Final Office Action mailed Aug. 16, 2021", 8 pgs.

"U.S. Appl. No. 17/125,298, Notice of Allowance mailed Nov. 26, 2021", 8 pgs.

"U.S. Appl. No. 17/125,298, Response filed Nov. 9, 2021 to Non Final Office Action mailed Aug. 16, 2021", 8 pgs.

"U.S. Appl. No. 17/206,991, Examiner Interview Summary mailed Feb. 22, 2023", 2 pgs.

"U.S. Appl. No. 17/206,991, Examiner Interview Summary mailed Oct. 5, 2023", 2 pgs.

"U.S. Appl. No. 17/206,991, Final Office Action mailed Feb. 16, 2023", 14 pgs.

"U.S. Appl. No. 17/206,991, Final Office Action mailed Nov. 16, 2023", 25 pgs.

"U.S. Appl. No. 17/206,991, Non Final Office Action mailed Apr. 4, 2024", 24 pgs.

"U.S. Appl. No. 17/206,991, Non Final Office Action mailed Jun. 29, 2023", 21 pgs.

"U.S. Appl. No. 17/206,991, Non Final Office Action mailed Oct. 20, 2022", 13 pgs.

(56) References Cited

OTHER PUBLICATIONS

"U.S. Appl. No. 17/206,991, Notice of Allowance mailed Aug. 2, 2024", 10 pgs.

"U.S. Appl. No. 17/206,991, Response filed Jan. 16, 2024 to Final Office Action mailed Nov. 16, 2023", 14 pgs.

"U.S. Appl. No. 17/206,991, Response filed Jan. 18, 2023 to Non Final Office Action mailed Oct. 20, 2022", 12 pgs.

"U.S. Appl. No. 17/206,991, Response filed May 8, 2023 to Final Office Action mailed Feb. 16, 2023", 13 pgs.

"U.S. Appl. No. 17/206,991, Response filed Jul. 5, 2024 to Non Final Office Action mailed Apr. 4, 2024", 13 pgs.

"U.S. Appl. No. 17/206,991, Response filed Sep. 28, 2023 to Non Final Office Action mailed Jun. 29, 2023", 12 pgs.

"U.S. Appl. No. 17/207,080, Corrected Notice of Allowability mailed Aug. 26, 2024", 4 pgs.

"U.S. Appl. No. 17/207,080, Final Office Action mailed Apr. 28, 2023", 11 pgs.

"U.S. Appl. No. 17/207,080, Final Office Action mailed Nov. 28, 2023", 13 pgs.

"U.S. Appl. No. 17/207,080, Non Final Office Action mailed Aug. 16, 2023", 14 pgs.

"U.S. Appl. No. 17/207,080, Non Final Office Action mailed Oct. 6, 2022", 9 pgs.

"U.S. Appl. No. 17/207,080, Notice of Allowance mailed Mar. 22, 2024", 7 pgs.

"U.S. Appl. No. 17/207,080, Response filed Jan. 5, 2023 to Non Final Office Action mailed Oct. 6, 2022", 11 pgs.

"U.S. Appl. No. 17/207,080, Response filed Feb. 21, 2024 to Final Office Action mailed Nov. 28, 2023", 12 pgs.

"U.S. Appl. No. 17/207,080, Response filed Jul. 27, 2023 to Final Office Action mailed Apr. 28, 2023", 12 pgs.

"U.S. Appl. No. 17/207,080, Response filed Nov. 10, 2023 to Non Final Office Action mailed Aug. 16, 2023", 10 pgs.

"U.S. Appl. No. 17/207,174, Corrected Notice of Allowability mailed Apr. 8, 2024", 2 pgs.

"U.S. Appl. No. 17/207,174, Examiner Interview Summary mailed Dec. 8, 2023", 2 pgs.

"U.S. Appl. No. 17/207,174, Final Office Action mailed Apr. 27, 2023", 17 pgs.

"U.S. Appl. No. 17/207,174, Non Final Office Action mailed Sep. 1, 2023", 16 pgs.

"U.S. Appl. No. 17/207,174, Non Final Office Action mailed Oct. 6, 2022", 15 pgs.

"U.S. Appl. No. 17/207,174, Notice of Allowance mailed Jan. 5, 2024", 16 pgs.

"U.S. Appl. No. 17/207,174, Response filed Jan. 5, 2023 to Non Final Office Action mailed Oct. 6, 2022", 10 pgs.

"U.S. Appl. No. 17/207,174, Response filed Jul. 27, 2023 to Final Office Action mailed Apr. 27, 2023", 13 pgs.

"U.S. Appl. No. 17/207,174, Response filed Nov. 30, 2023 to Non Final Office Action mailed Sep. 1, 2023", 13 pgs.

"U.S. Appl. No. 17/210,291, 312 Amendment filed Jan. 9, 2023", 9 pgs.

"U.S. Appl. No. 17/210,291, Corrected Notice of Allowability mailed Oct. 26, 2022", 2 pgs.

"U.S. Appl. No. 17/210,291, Examiner Interview Summary mailed Dec. 27, 2021", 3 pgs.

"U.S. Appl. No. 17/210,291, Final Office Action mailed Feb. 2, 2022", 51 pgs.

"U.S. Appl. No. 17/210,291, Non Final Office Action mailed May 13, 2022", 50 pgs.

"U.S. Appl. No. 17/210,291, Non Final Office Action mailed Sep. 22, 2021", 37 pgs.

"U.S. Appl. No. 17/210,291, Notice of Allowance mailed Oct. 19, 2022", 8 pgs.

"U.S. Appl. No. 17/210,291, Response filed May 2, 2022 to Final Office Action mailed Feb. 2, 2022", 11 pgs.

"U.S. Appl. No. 17/210,291, Response filed Sep. 13, 2022 to Non Final Office Action mailed May 13, 2022", 11 pgs.

"U.S. Appl. No. 17/210,291, Response filed Dec. 22, 2021 to Non Final Office Action mailed Sep. 22, 2021", 12 pgs.

"U.S. Appl. No. 17/210,291, Supplemental Notice of Allowability mailed Jan. 19, 2023", 11 pgs.

"U.S. Appl. No. 17/679,616, Corrected Notice of Allowability mailed Feb. 15, 2023", 2 pgs.

"U.S. Appl. No. 17/679,616, Notice of Allowance mailed Nov. 7, 2022", 9 pgs.

"U.S. Appl. No. 17/703,567, Corrected Notice of Allowability mailed Oct. 11, 2023", 2 pgs.

"U.S. Appl. No. 17/703,567, Non Final Office Action mailed Mar. 31, 2023", 13 pgs.

"U.S. Appl. No. 17/703,567, Notice of Allowance mailed Jul. 13, 2023", 7 pgs.

"U.S. Appl. No. 17/703,567, Response filed Jun. 14, 2023 to Non Final Office Action mailed Mar. 31, 2023", 9 pgs.

"U.S. Appl. No. 18/163,098, Advisory Action mailed Aug. 22, 2024", 3 pgs.

"U.S. Appl. No. 18/163,098, Final Office Action mailed Jun. 25, 2024", 22 pgs.

"U.S. Appl. No. 18/163,098, Final Office Action mailed Nov. 27, 2023", 40 pgs.

"U.S. Appl. No. 18/163,098, Non Final Office Action mailed Feb. 2, 2024", 20 pgs.

"U.S. Appl. No. 18/163,098, Non Final Office Action mailed Jul. 14, 2023", 26 pgs.

"U.S. Appl. No. 18/163,098, Notice of Allowance mailed Sep. 23, 2024", 8 pgs.

"U.S. Appl. No. 18/163,098, Response filed Jan. 19, 2024 to Final Office Action mailed Nov. 27, 2023", 13 pgs.

"U.S. Appl. No. 18/163,098, Response filed Mar. 28, 2024 to Non Final Office Action mailed Feb. 2, 2024", 12 pgs.

"U.S. Appl. No. 18/163,098, Response filed Aug. 13, 2024 to Final Office Action mailed Jun. 25, 2024", 12 pgs.

"U.S. Appl. No. 18/163,098, Response filed Oct. 16, 2023 to Non Final Office Action mailed Jul. 14, 2023", 13 pgs.

"U.S. Appl. No. 18/165,777, Corrected Notice of Allowability mailed Nov. 22, 2023", 2 pgs.

"U.S. Appl. No. 18/165,777, Notice of Allowance mailed Jul. 19, 2023", 9 pgs.

"European Application Serial No. 21718750.9, Communication Pursuant to Article 94(3) EPC mailed Mar. 5, 2024", 4 pgs.

"European Application Serial No. 21718752.5, Communication Pursuant to Article 94(3) EPC mailed Mar. 13, 2024", 5 pgs.

"European Application Serial No. 21718771.5, Communication Pursuant to Article 94(3) EPC mailed Jul. 4, 2024", 8 pgs.

"European Application Serial No. 21718771.5, Response filed Oct. 23, 2024 to Communication Pursuant to Article 94(3) EPC mailed Jul. 4, 2024", 32 pgs.

"European Application Serial No. 21779785.1, Extended European Search Report mailed Feb. 5, 2024", 12 pgs.

"European Application Serial No. 21779785.1, Response filed Aug. 8, 2024 to Extended European Search Report mailed Feb. 5, 2024", 25 pgs.

"European Application Serial No. 21779785.1, Response Filed Dec. 2, 2022 to Communication pursuant to Rules 161(2) and 162 EPC mailed Nov. 9, 2023", 25 pgs.

"International Application Serial No. PCT/US2021/023712, International Preliminary Report on Patentability mailed Oct. 6, 2022", 8 pgs.

"International Application Serial No. PCT/US2021/023712, International Search Report mailed Jun. 29, 2021", 4 pgs.

"International Application Serial No. PCT/US2021/023712, Written Opinion mailed Jun. 29, 2021", 6 pgs.

"International Application Serial No. PCT/US2021/023748, International Preliminary Report on Patentability mailed Oct. 6, 2022", 8 pgs.

"International Application Serial No. PCT/US2021/023748, International Search Report mailed Jun. 29, 2021", 4 pgs.

"International Application Serial No. PCT/US2021/023748, Written Opinion mailed Jun. 29, 2021", 6 pgs.

(56) References Cited

OTHER PUBLICATIONS

"International Application Serial No. PCT/US2021/023918, International Preliminary Report on Patentability mailed Oct. 6, 2022", 9 pgs.

"International Application Serial No. PCT/US2021/023918, International Search Report mailed Jun. 28, 2021", 4 pgs.

"International Application Serial No. PCT/US2021/023918, Written Opinion mailed Jun. 28, 2021", 7 pgs.

"International Application Serial No. PCT/US2021/024180, International Preliminary Report on Patentability mailed Oct. 13, 2022", 6 pgs.

"International Application Serial No. PCT/US2021/024180, International Search Report mailed Jul. 6, 2021", 5 pgs.

"International Application Serial No. PCT/US2021/024180, Written Opinion mailed Jul. 6, 2021", 4 pgs.

"Korean Application Serial No. 10-2022-7036915, Notice of Preliminary Rejection mailed Oct. 30, 2024", w/ English translation, 7 pgs.

"Korean Application Serial No. 10-2022-7036916, Notice of Preliminary Rejection mailed Jun. 5, 2024", W/English Translation, 4 pgs.

"Korean Application Serial No. 10-2023-7010071, Notice of Preliminary Rejection mailed Oct. 29, 2024", w/ English Translation, 4 pgs.

"Korean Application Serial No. 10-2024-7034270, Notice of Preliminary Rejection mailed Oct. 27, 2024", W/English Translation, 4 pgs.

Payette, Chuck, et al., "Enabling reliable and efficient wireless video uplink", Bell Labs Technical Journal, Wiley, CA, US, vol. 16, No. 2, (Sep. 1, 2011), 169-191.

"U.S. Appl. No. 18/585,553, Non Final Office Action mailed Mar. 14, 2025", 11 pgs.

"Korean Application Serial No. 10-2022-7036916, Response filed Aug. 1, 2024 to Notice of Preliminary Rejection mailed Jun. 5, 2024", w/ English claims, 21 pgs.

"Korean Application Serial No. 10-2022-7036916, Voluntary Amendment filed Feb. 20, 2024", w/ English claims, 24 pgs.

"Korean Application Serial No. 10-2023-7010071, Voluntary Amendment filed Oct. 24, 2024", w/ English claims, 27 pgs.

"U.S. Appl. No. 18/479,547, Non Final Office Action mailed Apr. 9, 2025", 6 pgs.

"U.S. Appl. No. 18/479,547, Response filed Jun. 30, 2025 to Non Final Office Action mailed Apr. 9, 2025", 10 pgs.

"U.S. Appl. No. 18/585,553, Response filed Jun. 12, 2025 to Non Final Office Action mailed Mar. 14, 2025", 3 pgs.

"Chinese Application Serial No. 202180037702.5, Office Action mailed Mar. 22, 2025", W/English Translation, 24 pgs.

"Chinese Application Serial No. 202180038601.X, Office Action mailed Mar. 27, 2025", W/English Translation, 21 pgs.

"Chinese Application Serial No. 202180038601.X, Response filed Jun. 24, 2025 to Office Action mailed Mar. 27, 2025", w/ English Claims, 14 pgs.

"Korean Application Serial No. 10-2022-7036915, Response filed Jan. 21, 2025 to Notice of Preliminary Rejection mailed Oct. 30, 2024", w/ English Claims, 25 pgs.

"Korean Application Serial No. 10-2023-7010071, Response filed Jan. 23, 2025 to Notice of Preliminary Rejection mailed Oct. 29, 2024", w/ English Claims, 16 pgs.

"Korean Application Serial No. 10-2024-7034270, Response filed Jan. 24, 2025 to Notice of Preliminary Rejection mailed Oct. 27, 2024", w/ English Claims, 18 pgs.

"U.S. Appl. No. 18/479,547, Notice of Allowance mailed Jul. 22, 2025", 8 pgs.

"U.S. Appl. No. 18/585,553, Notice of Allowance mailed Aug. 14, 2025", 8 pgs.

"U.S. Appl. No. 18/740,239, Notice of Allowance mailed Sep. 22, 2025", 10 pgs.

"Chinese Application Serial No. 202180037702.5, Office Action mailed Aug. 1, 2025", w/ English translation, 22 pgs.

"Chinese Application Serial No. 202180037702.5, Response filed Jul. 17, 2025 to Office Action mailed Mar. 22, 2025", w/ English Claims, 16 pgs.

"Chinese Application Serial No. 202180037702.5, Response filed Sep. 28, 2025 to Office Action mailed Aug. 1, 2025", W/English Claims, 17 pgs.

"Chinese Application Serial No. 202180038601.X, Office Action mailed Aug. 16, 2025", w/ English translation, 17 pgs.

"Chinese Application Serial No. 202180038601.X, Response filed Oct. 14, 2025 to Office Action mailed Aug. 16, 2025", w/ English Claims, 12 pgs.

"European Application Serial No. 21718752.5, Response filed Jun. 24, 2024 to Communication Pursuant to Article 94(3) EPC mailed Mar. 13, 2024", 12 pgs.

* cited by examiner

500

800

805
CAUSE DISPLAY OF A VIRTUAL OBJECT ON FIRST DEVICE

810
RECEIVE USER INPUT FROM FIRST DEVICE COMPRISING AN INTERACTION WITH THE DISPLAY OF THE VIRTUAL OBJECT

815
MODIFY VIRTUAL OBJECT BASED ON USER INPUT

820
CAUSED DISPLAY OF MODIFIED VIRTUAL OBJECT ON SECOND DEVICE

800

805

905  CAUSE DISPLAY OF VIRTUAL OBJECT ON SECOND DEVICE

810

815

820

910  CAUSE DISPLAY OF MODIFIED VIRTUAL OBJECT ON FIRST DEVICE

SHARED CONTROL OF A VIRTUAL OBJECT BY MULTIPLE DEVICES

CLAIM OF PRIORITY

This application is a continuation of U.S. application Ser. No. 17/703,567, filed Mar. 24, 2022, which application is a continuation of U.S. application Ser. No. 16/947,083, filed Jul. 17, 2020, now issued as U.S. Pat. No. 11,340,857, which claims the benefit of priority to U.S. Provisional Application Ser. No. 62/876,361, filed on Jul. 19, 2019, which is incorporated herein by reference in its entirety.

TECHNICAL FIELD

The present disclosure generally relates to mobile and wearable computing technology. In particular, example embodiments of the present disclosure address systems, methods, and user interfaces to facilitate shared control of a virtual object by multiple devices over a network.

BACKGROUND

Many wearable and mobile devices such as "smart" glasses include an embedded camera. Virtual rendering systems implemented using these types of devices can be used to create engaging and entertaining augmented reality experiences, in which three-dimensional (3D) virtual object graphics content appears to be present in the real world.

BRIEF DESCRIPTION OF THE DRAWINGS

To easily identify the discussion of any particular element or act, the most significant digit or digits in a reference number refer to the figure number in which that element or act is first introduced.

DETAILED DESCRIPTION

Figure 1:
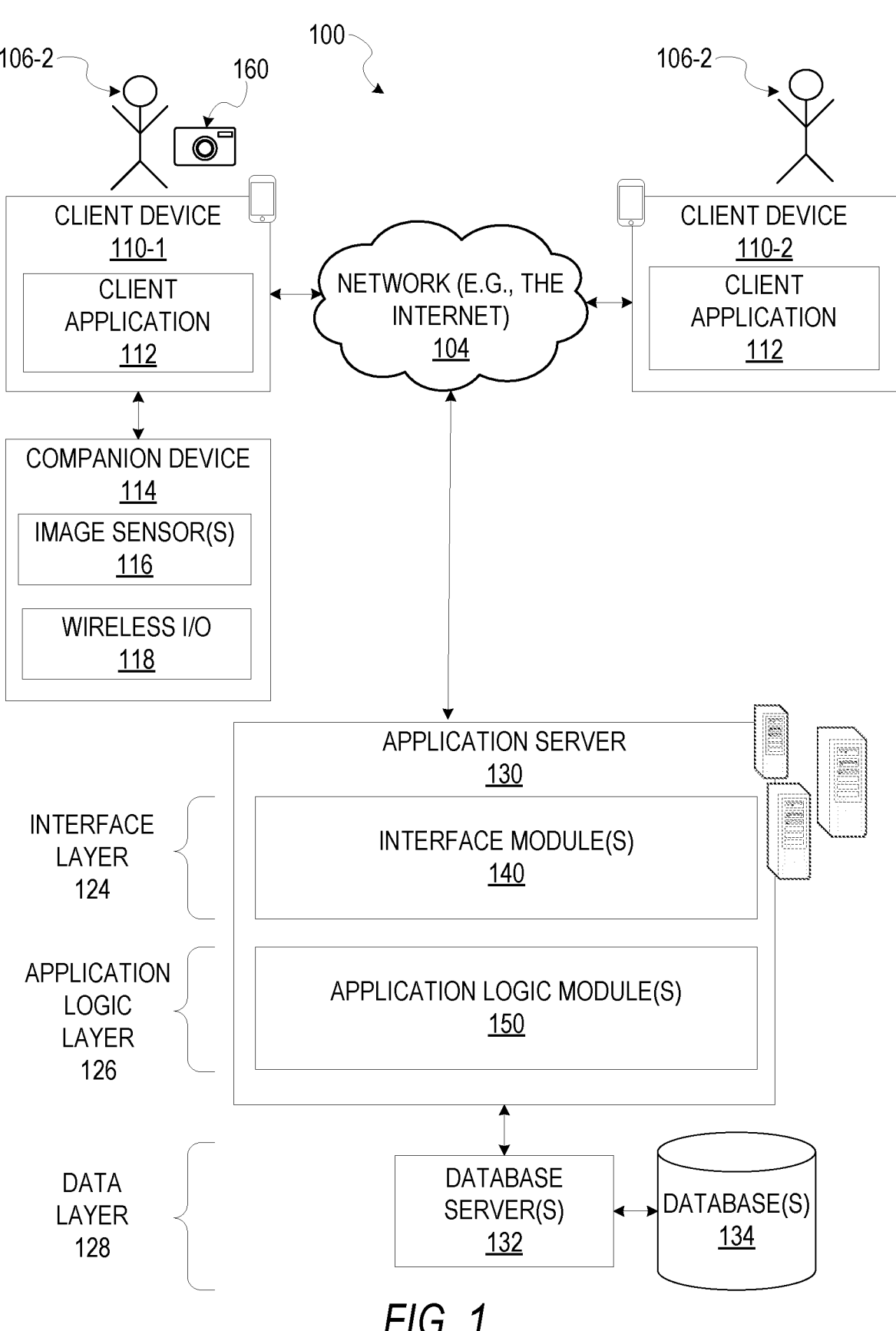
FIG. 1 is a system diagram illustrating an example communication system for facilitating shared control of a virtual object by two or more users, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Aspects of the present disclosure include systems, methods, techniques, instruction sequences, and computing machine program products for facilitating shared control of a virtual object by two or more users. A virtual object is displayed by a first device associated with a first user. The virtual object may also be displayed by a second device associated with a second user. The first and second devices are separate devices that are in communication over a network and may be physically separate. Either of the users may view, interact with, and modify the virtual object. Modifications made by a first user to the virtual object will also be presented by the device of the second user. Hence, the first user can remotely control a display of a virtual object presented by the device of the second user. In this way, aspects of the present disclosure allow users to communicate directly by engaging in augmented reality experiences.

As a general example, based on the first user being approved by the second user to control a virtual object, the first user may interact with the display of the virtual object, for example, using gestures such as pinch, spread, tap, or press, to change aspects of the virtual object such as a size, shape, location, animation state, or other attributes of the virtual object. A modified virtual object based on the changes by the first user is then displayed by both the first and second devices without any further action or interaction with by the second user. In this way, the first and second users "share control" of the virtual object. The shared control of a virtual object enriches communication between users by enabling users to better express themselves, make decisions, plan and coordinate, or exchange feedback, for example.

The display of the virtual object (including any modifications made thereto) may be overlaid on a real-world environment to create an augmented reality experience for the first and second users. For example, the display of the virtual object may be overlaid on the real-world environment surrounding the second user. Depending on the embodiment, the augmented reality experience may be created by augmenting images produced by a camera coupled to one of the devices (e.g., the device on which the experience is presented) or by displaying the virtual object on a transparent display device through which the real-world environment may be viewed by a user. Depending on the embodiment, the first device may display the virtual object overlaid on a real-world environment surrounding the first user, or the real-world environment surrounding the second user.

In a first example, a first user is driving while using a first device that provides an augmented reality experience in which a marker is presented to the first user in augmented reality at the first user's destination. The first user may decide to get dinner and ask a second user for a suggestion. The second user may receive a notification of the request and in turn, identify a great restaurant to recommend to the first user. Utilizing a second device, the second user may move the augmented reality marker to the recommended restaurant, thereby changing a route of the first user and augmenting the surrounding environment as it appears to the first user.

In a second example, a first user may remotely add heart stickers to a wall in a room within an augmented reality experience of a second user to decorate the room. The first user may remotely change the heart stickers to flowers within the augmented reality experience without any interaction or action by the second user.

In a third example, a first user is engaging with an augmented reality experience within a grocery store and is unable to locate a particular item on their shopping list. A second user may join the augmented reality experience and add a marker within the augmented reality view of the second user to indicate a location of the item.

In a fourth example, a first user provides access to a remote second user to augment the first user's view of a surrounding environment. The first user may send a picture of the surrounding environment to the second user, and the second user can trigger an augmented reality experience for the first user that changes the first users' view of the sky to red. In this way, the second user mutated the first user's view of their physical environment via augmented reality by changing the sky from blue to red.

In a fifth example, a first user lands at an airport and at that moment, the first user is presented with a welcome rainbow triggered by geo-located trigger established by a remote second friend.

In a sixth example, a first and second user can both view an augmented reality object such as a three-dimensional block. The second user can interact with the block, for example, by tapping on the block, and the block changes size with each interaction. As the second user interacts with the block, the first user can view the ever-changing size of the block caused by the second user's interaction with the block.

Notably, in the examples provided above, views of a surrounding environment of a first user is controlled and changed by a remote second user without any action by the first user. In this way, the first user can relinquish control of their view to create new opportunities for communication and fellowship with remote users.

FIG. 1 is a system diagram illustrating an example communication system 100 for facilitating shared control of a virtual object by two or more users 106, according to some example embodiments. The communication system 100 may, for example, be a messaging system where clients communicate and exchange data within the communication system 100, where certain data is communicated to and from wearable devices described herein. The data may pertain to various functions (e.g., sending and receiving image content as well as text and other media communication) and aspects associated with the communication system 100 and its users. Although the communication system 100 is illustrated herein as having a client-server architecture, other embodiments may include other network architectures, such as peer-to-peer or distributed network environments.

As shown in FIG. 1, the communication system 100 includes an application server 130. The application server 130 is generally based on a three-tiered architecture, consisting of an interface layer 124, an application logic layer 126, and a data layer 128. As is understood by skilled artisans in the relevant computer and Internet-related arts, each module or engine shown in FIG. 1 represents a set of executable software instructions and the corresponding hardware (e.g., memory and processor) for executing the instructions. In various embodiments, additional functional modules and engines may be used with a messaging system, such as that illustrated in FIG. 1, to facilitate additional functionality that is not specifically described herein. Furthermore, the various functional modules and engines depicted in FIG. 1 may reside on a single server computer or may be distributed across several server computers in various arrangements. Moreover, although the application server 130 is depicted in FIG. 1 as having a three-tiered architecture, the inventive subject matter is by no means limited to such an architecture.

As shown in FIG. 1, the interface layer 124 consists of interface modules (e.g., a web server) 140, which receive requests from various client-devices and servers, such as client devices 110-1 and 110-2 executing client application 112. In response to received requests, the interface modules 140 communicate appropriate responses to requesting devices via a network 104. For example, the interface modules 140 can receive requests such as Hypertext Transfer Protocol (HTTP) requests or other web-based application programming interface (API) requests.

The client devices 110 can execute conventional web browser applications or applications (also referred to as "apps") that have been developed for a specific platform to include any of a wide variety of mobile devices and mobile-specific operating systems (e.g., IOS™, ANDROID™ WINDOWS® PHONE). In an example, the client devices 110 are executing the client application 112. The client application 112 can provide functionality to present information to users 106-1 and 106-2 and communicate via the network 104 to exchange information with the application server 130. Each of the client devices 110-1 and 110-2 can comprise a device that includes at least a display and communication capabilities with the network 104 to access the application server 130. The client devices 110 comprise, but are not limited to, remote devices, work stations, computers, general-purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network personal computers (PCs), mini-computers, and the like. The users 106-1 and 106-2 can include a person, a machine, or other means of interacting with the client devices 110. In some embodiments, the users 106-1 and 106-2 interact with the application server 130 via the client devices 110-1 and 110-2, respectively.

As shown, the communication system 100 additionally includes a companion device 114 communicatively connected to the client device 110-1. In various embodiments, the companion device 114 is configured for wired communication with either the client device 110-1 or the application server 130. The companion device 114 may also be simultaneously configured for wireless communication with the client device 110-2, the application server 130, or both. The companion device 114 may be a wearable device such as glasses, a visor, a watch, or other network-enabled items. The companion device 114 may also be any device described herein that accesses a network such as network 104 via another device such as the client device 110-1.

The companion device 114 includes image sensors 116 and wireless input and output (I/O) 118. The companion device 114 may include one or more processors, a display, a battery, and a memory, but may have limited processing and memory resources. In such embodiments, the client device 110-2 and/or server devices used for the application server 130 may be used via network connections to provide remote processing and memory resources for the companion device 114. In one embodiment, for example, the client companion device 114 may be a pair of network-enabled glasses, such as glasses 331 of FIG. 3, and the client device 110-1 may be a smartphone that enables access to the application server 130 to enable communication of image content captured with the image sensor(s) 116.

As shown in FIG. 1, the data layer 128 has one or more database servers 132 that facilitate access to information storage repositories or databases 134. The databases 134 are storage devices that store data such as member profile data, social graph data (e.g., relationships between members of the application server 130), and other user data.

An individual can register with the application server 130 to become a member of the application server 130. Once registered, a member can form social network relationships (e.g., friends, followers, or contacts) on the application server 130 and interact with a broad range of applications provided by the application server 130.

The application logic layer 126 includes various application logic modules 150, which, in conjunction with the interface modules 140, generate various user interfaces with data retrieved from various data sources or data services in the data layer 128. Individual application logic modules 150 may be used to implement the functionality associated with various applications, services, and features of the application server 130. For instance, a messaging application can be implemented with one or more of the application logic modules 150. The messaging application provides a messaging mechanism for users of the client devices 110-1 and 110-2 to send and receive messages that include text and media content such as pictures and video. The client devices 110-1 and 110-2 may access and view the messages from the messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient.

Additionally, the application logic modules 150 embodying the messaging application or other application logic modules 150 may provide functionality to facilitate shared control of a virtual object by the users 106-1 and 106-2. Within the context of shared control of a virtual object, client devices 110-1 and 110-2 may display a virtual object as part of an augmented reality experience. That is, the display of the virtual object is overlaid on a real-world environment. The users 106-1 and 106-2 may view, interact with, and modify the virtual object. Modifications made to the virtual object by either user are displayed as part of the augmented reality experience to both users 106-1 and 106-2.

A virtual object may be included in one or more messages exchanged using the messaging application, for example. These messages may include media content comprising one or more images of a real-world environment that is augmented to include the display of the virtual object overlaid on the real-world environment. The media content may further include audio data recorded in conjunction with the capturing of the images. The media content may comprise a single image frame or a short video (e.g., comprising multiple image frames).

The camera 160 is communicatively coupled to the client device 110-1. For example, in some embodiments, the camera 160 may be embedded in the client device 110-1 (e.g., a smartphone with an embedded camera). In some embodiments, the camera 160 may be embedded in the companion device 114 and may comprise or correspond to the image sensor(s) 116.

Figure 2:
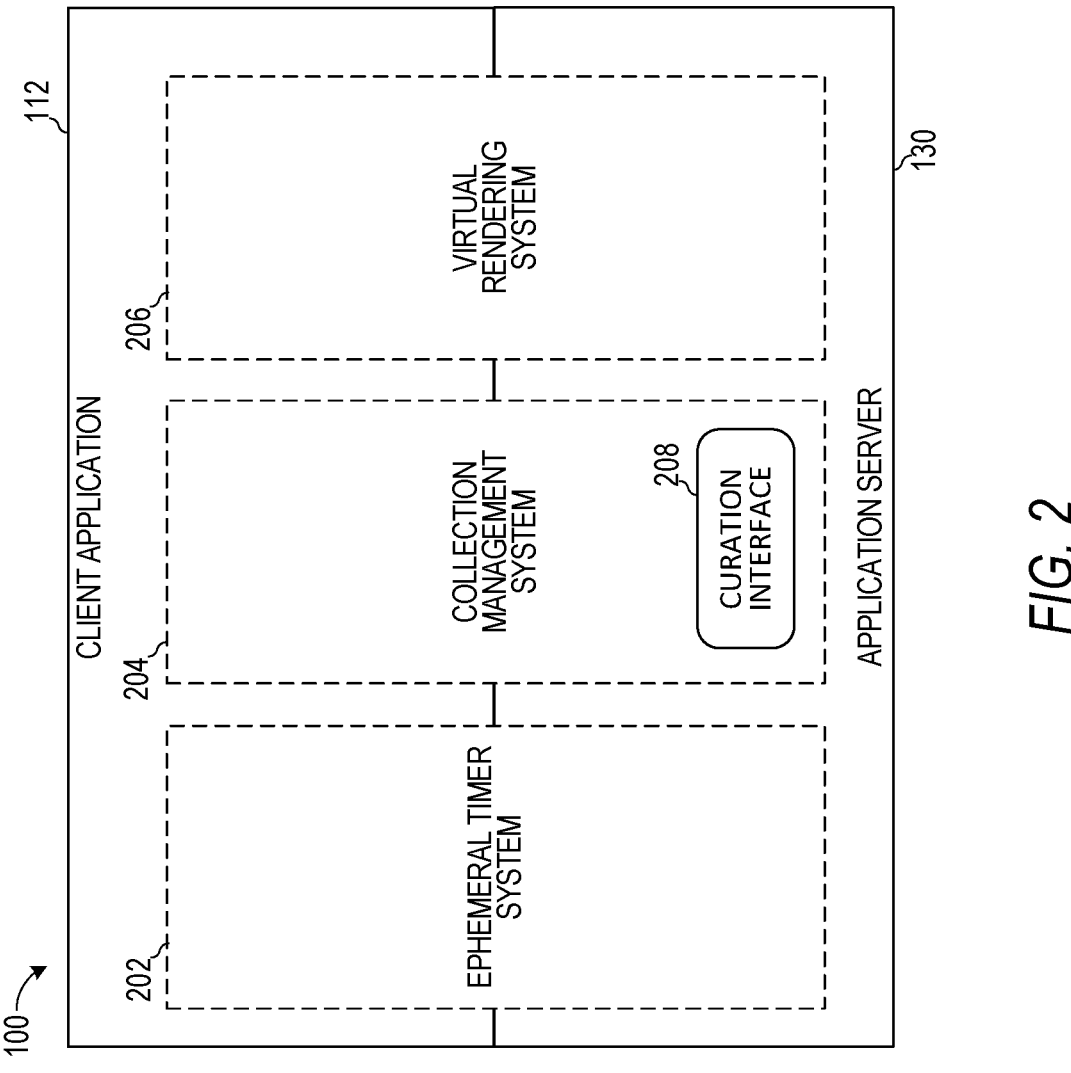
FIG. 2 is block diagram illustrating further details of the communication system, according to example embodiments.

FIG. 2 is block diagram illustrating further details regarding the communication system 100, according to example embodiments. Specifically, the communication system 100 is shown to comprise the client application 112 and the application server 130, which in turn embody a number of subsystems, namely an ephemeral timer system 202, a collection management system 204, and a virtual rendering system 206.

The ephemeral timer system 202 is responsible for enforcing temporary access to content permitted by the client application 112 and the application server 130. To this end, the ephemeral timer system 202 incorporates a number of timers that, based on duration and display parameters associated with a message, or collection of messages (e.g., a story), selectively display and enable access to messages and associated content via the client application 112.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection.

The virtual rendering system 206 provides various functions that enable a user to augment or otherwise modify or edit media content (e.g., comprising image data and/or audio data). For example, the virtual rendering system 206 provides functions related to the generation, publishing, and shared control (including modifications) of virtual objects for messages processed by the communication system 100. The virtual object may comprise a media overlay. A media overlay may include audio and visual content and visual effects. Examples of audio and visual content include pictures, texts, logos, animations, and sound effects. The audio and visual content or the visual effects can be applied to a media content item (e.g., an image). For example, the media overlay includes text that can be overlaid on top of an image generated by the camera 160. The media overlays may be stored in the database(s) 134 and accessed through the database server(s) 132.

In an example embodiment, the virtual rendering system 206 provides a user-based publication platform that enables users to select a geolocation on a map and upload content associated with the selected geolocation. The user may also specify circumstances under which a particular media overlay should be offered to other users. The virtual rendering system 206 generates a media overlay that includes the uploaded content and associates the uploaded content with the selected geolocation.

Figure 3:
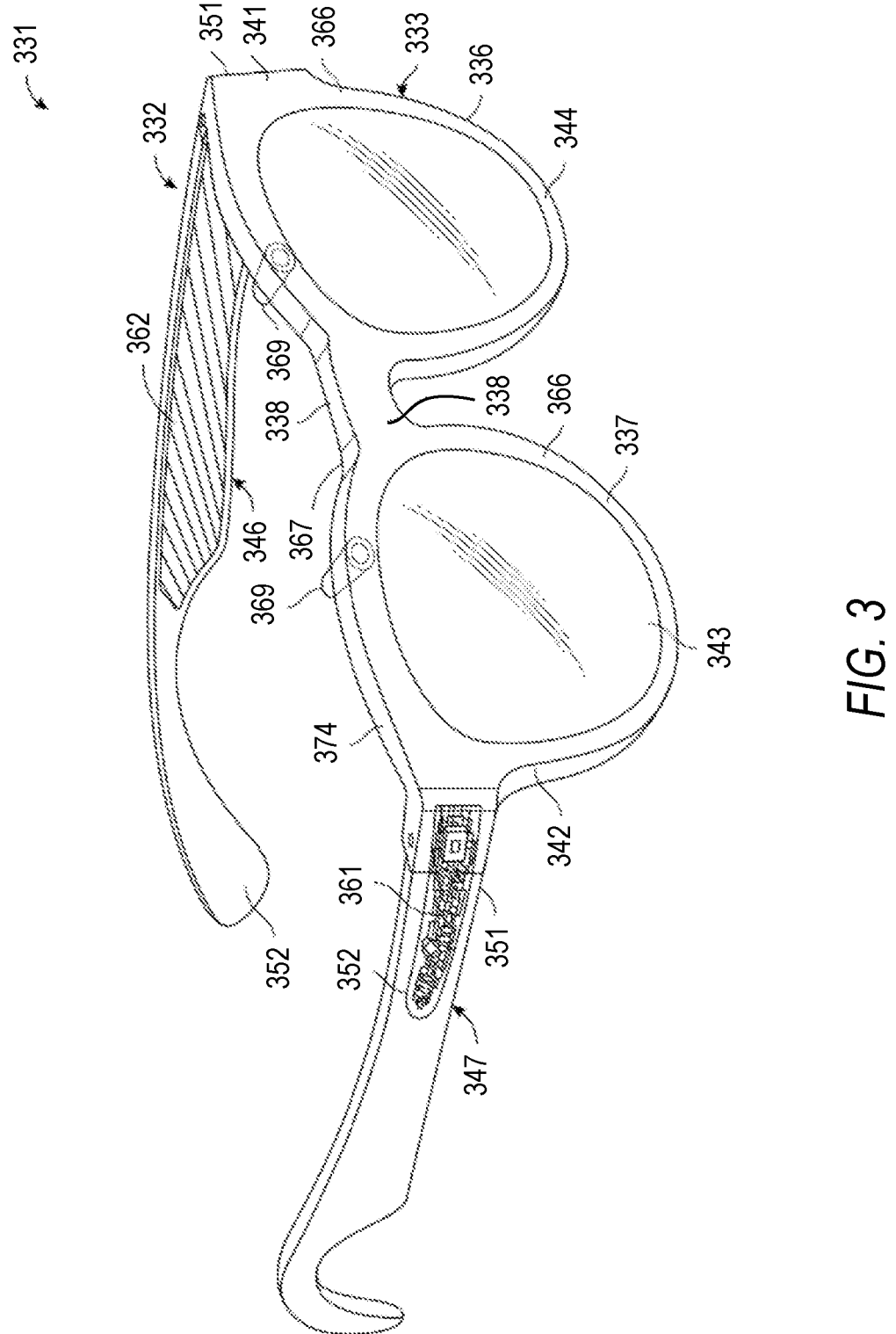
FIG. 3 is a diagram illustrating a wearable companion device for use in sharing control of a virtual object, according to some example embodiments.

FIG. 3 is a diagram illustrating a wearable companion device 114 in the example form of glasses 331 for use in a camera sharing session, according to some example embodiments. The glasses 331 can include a frame 332 made from any suitable material such as plastic or metal, including any suitable shape memory alloy. The frame 332 can have a front piece 333 that can include a first or left lens, display, or optical element holder 336 and a second or right lens, display, or optical element holder 337 connected by a bridge 338. The front piece 333 additionally includes a left end portion 341 and a right end portion 342. A first or left optical element 344 and a second or right optical element 343 can be provided within respective left and right optical element holders 336, 337. Each of the optical elements 343, 344 can be a lens, a display (e.g., a transparent display), a display assembly, or a combination of the foregoing. In some embodiments, for example, the glasses 331 are provided with an integrated near-eye display mechanism that enables, for example, display to the user of preview images for visual media captured by cameras 369 of the glasses 331. In some embodiments, integrated near-eye display mechanism allows for display of a virtual object such that the virtual object is overlaid on a real-world environment that is viewable through the optical elements 343 and 344.

The frame 332 additionally includes a left arm or temple piece 346 and a right arm or temple piece 347 coupled to the respective left and right end portions 341, 342 of the front piece 333 by any suitable means, such as a hinge (not shown), so as to be coupled to the front piece 333, or rigidly or fixably secured to the front piece 333 so as to be integral with the front piece 333. Each of the temple pieces 346 and 347 can include a first portion 351 that is coupled to the respective end portion 341 or 342 of the front piece 333 and any suitable second portion 352, such as a curved or arcuate piece, for coupling to the ear of the user. In one embodiment, the front piece 333 can be formed from a single piece of material, so as to have a unitary or integral construction. In one embodiment, the entire frame 332 can be formed from a single piece of material so as to have a unitary or integral construction.

The glasses 331 can include a device, such as a computer 361, which can be of any suitable type so as to be carried by the frame 332 and, in one embodiment, of a suitable size and shape so as to be at least partially disposed in one of the temple pieces 346 and 347. In one embodiment, the computer 361 has a size and shape similar to the size and shape of one of the temple pieces 346, 347 and is thus disposed almost entirely if not entirely within the structure and confines of such temple pieces 346 and 347. In one embodiment, the computer 361 can be disposed in both of the temple pieces 346, 347. The computer 361 can include one or more processors with memory, wireless communication circuitry, and a power source. The computer 361 comprises low-power circuitry, high-speed circuitry, and a display processor. Various other embodiments may include these elements in different configurations or integrated together in different ways.

The computer 361 additionally includes a battery 362 or other suitable portable power supply. In one embodiment, the battery 362 is disposed in one of the temple pieces 346 or 347. In the glasses 331 shown in FIG. 3, the battery 362 is shown as being disposed in the left temple piece 346 and electrically coupled using a connection 374 to the remainder of the computer 361 disposed in the right temple piece 347. One or more I/O devices can include a connector or port (not shown) suitable for charging a battery 362 accessible from the outside of the frame 332, a wireless receiver, transmitter, or transceiver (not shown), or a combination of such devices. Given the limited size of the glasses 331 and the computer 361, resource-intensive operations such as video streaming can quickly drain the battery 362 and can be a strain on the one or more processors of the computer 361 that can lead to overheating.

The glasses 331 include digital cameras 369. Although two cameras 369 are depicted, other embodiments contemplate the use of a single or additional (i.e., more than two) cameras. For ease of description, various features relating to the cameras 369 will further be described with reference to only a single camera 369, but it will be appreciated that these features can apply, in suitable embodiments, to both cameras 369.

Consistent with some embodiments, the cameras 369 are examples of the camera 160 of the first user 106-1 discussed above in reference to FIG. 1. Accordingly, in these embodiments, the glasses 331 may be worn by the user 106-1. Further, in these embodiments, the user 106-2 may be enabled to control a virtual object displayed by the glasses 331. That is, a virtual object displayed by the glasses 331 may also be displayed by the client device 110-2 and the user 106-2 may interact with the display of the virtual object to modify the virtual object. Modifications made by the user 106-2 to the virtual object are also presented by the glasses 331.

In various embodiments, the glasses 331 may include any number of input sensors or peripheral devices in addition to the cameras 369. The front piece 333 is provided with an outward-facing, forward-facing, front, or outer surface 366 that faces forward or away from the user when the glasses 331 are mounted on the face of the user, and an opposite inward-facing, rearward-facing, rear, or inner surface 367 that faces the face of the user (e.g., user 106-1) when the glasses 331 are mounted on the face of the user. Such sensors can include inward-facing video sensors or digital imaging modules such as cameras that can be mounted on or provided within the inner surface 367 of the front piece 333 or elsewhere on the frame 332 so as to be facing the user, and outward-facing video sensors or digital imaging modules such as the cameras 369 that can be mounted on or provided with the outer surface 366 of the front piece 333 or elsewhere on the frame 332 so as to be facing away from the user. Such sensors, peripheral devices, or peripherals can additionally include biometric sensors, location sensors, accelerometers, or any other such sensors.

The glasses 331 further include an example embodiment of a camera control mechanism or user input mechanism comprising a camera control button mounted on the frame 332 for haptic or manual engagement by the user. The camera control button provides a bi-modal or single-action mechanism in that it is disposable by the user between only two conditions, namely an engaged condition and a disengaged condition. In this example embodiment, the camera control button is a pushbutton that is by default in the disengaged condition, being depressible by the user to dispose it to the engaged condition. Upon release of the depressed camera control button, it automatically returns to the disengaged condition.

In other embodiments, the single-action input mechanism can instead be provided by, for example, a touch-sensitive button comprising a capacitive sensor mounted on the frame 332 adjacent to its surface for detecting the presence of a user's finger to dispose the touch-sensitive button to the engaged condition when the user touches a finger to the corresponding spot on the outer surface of the frame 332. It will be appreciated that the above-described camera control button and capacitive touch button are but two examples of a haptic input mechanism for single-action control of the camera 369 and that other embodiments may employ different single-action haptic control arrangements.

Figure 4:
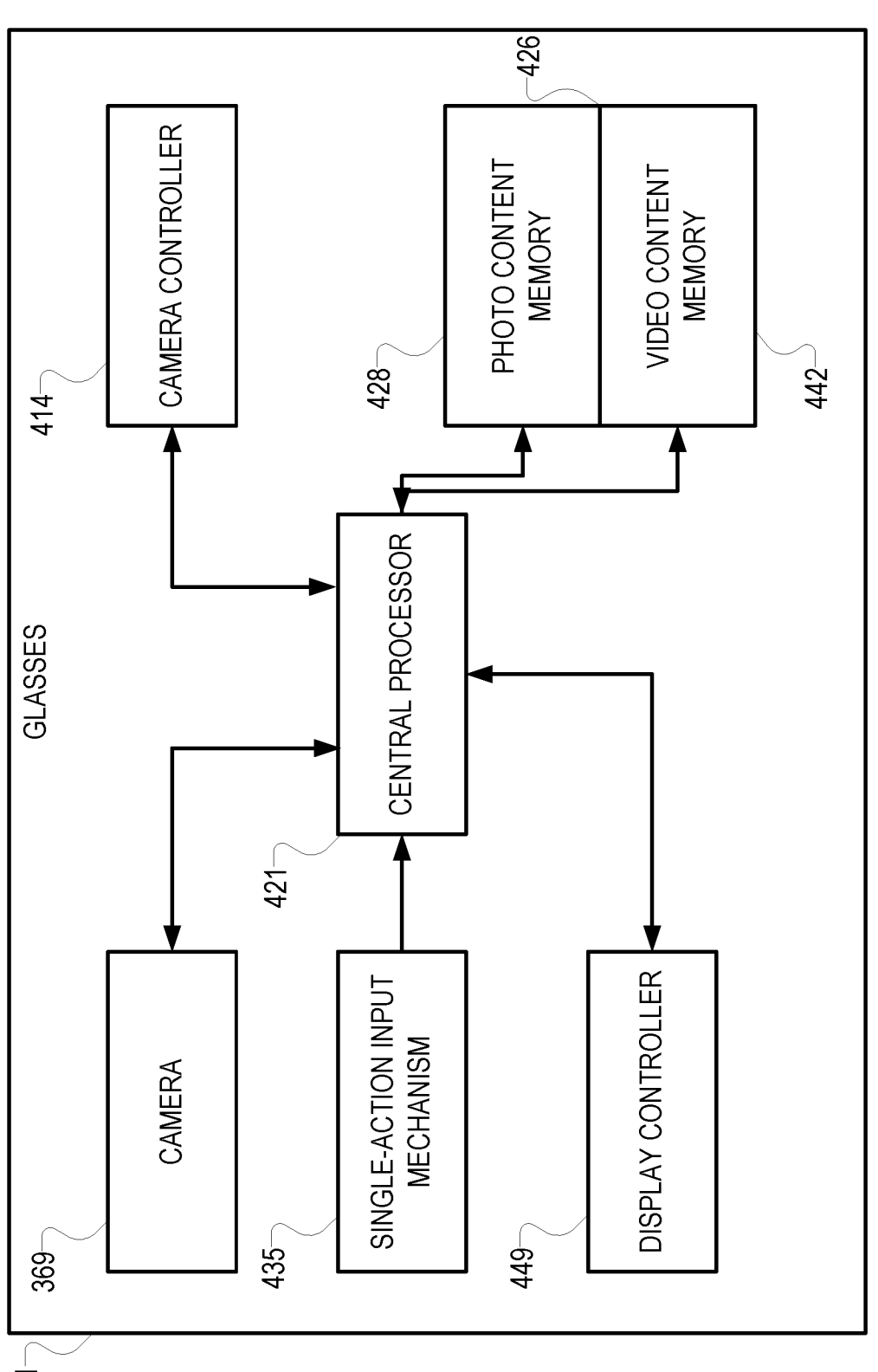
FIG. 4 is a block diagram illustrating aspects of the wearable device, according to some example embodiments.

FIG. 4 is a block diagram illustrating aspects of the wearable device in the example form of the glasses 331, according to some example embodiments. The computer 361 of the glasses 331 includes a central processor 421 in communication with an onboard memory 426. The central processor 421 may be a CPU and/or a graphics processing unit (GPU). The memory 426 in this example embodiment comprises a combination of flash memory and random-access memory.

The glasses 331 further include a camera controller 414 in communication with the central processor 421 and the camera 369. The camera controller 414 comprises circuitry configured to control recording of either photographic content or video content based upon processing of control signals received from the single-action input mechanism that includes the camera control button, and to provide for automatic adjustment of one or more image-capture parameters pertaining to capturing of image data by the camera 369 and on-board processing of the image data prior to persistent storage thereof and/or to presentation thereof to the user for viewing or previewing.

In some embodiments, the camera controller 414 comprises permanently configured circuitry, such as firmware or an application-specific integrated circuit (ASIC) configured to perform the various functions described herein. In other embodiments, the camera controller 414 may comprise a dynamically reconfigurable processor executing instructions that temporarily configure the processor to execute the various functions described herein.

The camera controller 414 interacts with the memory 426 to store, organize, and present image content in the form of photo content and video content. To this end, the memory 426 in this example embodiment comprises a photo content memory 428 and a video content memory 442. The camera controller 414 is thus, in cooperation with the central processor 421, configured to receive from the camera 369 image data representative of digital images produced by the camera 369 in accordance with some of the image-capture parameters, to process the image data in accordance with some of the image-capture parameters, and to store the processed image data in an appropriate one of the photo content memory 428 and the video content memory 442.

The camera controller 414 is further configured to cooperate with a display controller 449 to cause display on a display mechanism incorporated in the glasses 331 of selected photos and videos in the memory 426 and thus to provide previews of captured photos and videos. In some embodiments, the camera controller 414 will manage processing of images captured using automatic bracketing parameters for inclusion in a video file.

A single-action input mechanism 435 is communicatively coupled to the central processor 421 and the camera controller 414 to communicate signals representative of a current state of the camera control button and thereby to communicate to the camera controller 414 whether or not the camera control button is currently being pressed. The camera controller 414 further communicates with the central processor 421 regarding the input signals received from the single-action input mechanism 435. In one embodiment, the camera controller 414 is configured to process input signals received via the single-action input mechanism 435 to determine whether a particular user engagement with the camera control button is to result in a recording of video content or photographic content and/or to dynamically adjust one or more image-capture parameters based on processing of the input signals. For example, pressing of the camera control button for longer than a predefined threshold duration causes the camera controller 414 automatically to apply relatively less rigorous video processing to captured video content prior to persistent storage and display thereof. Conversely, pressing of the camera control button for shorter than the threshold duration in such an embodiment causes the camera controller 414 automatically to apply relatively more rigorous photo stabilization processing to image data representative of one or more still images.

The glasses 331 may further include various components common to mobile electronic devices such as smart glasses or smart phones (for example, including a display controller for controlling display of visual media (including photographic and video content captured by the camera 369) on a display mechanism incorporated in the device). Note that the schematic diagram of FIG. 4 is not an exhaustive representation of all components forming part of the glasses 331.

Figure 5:
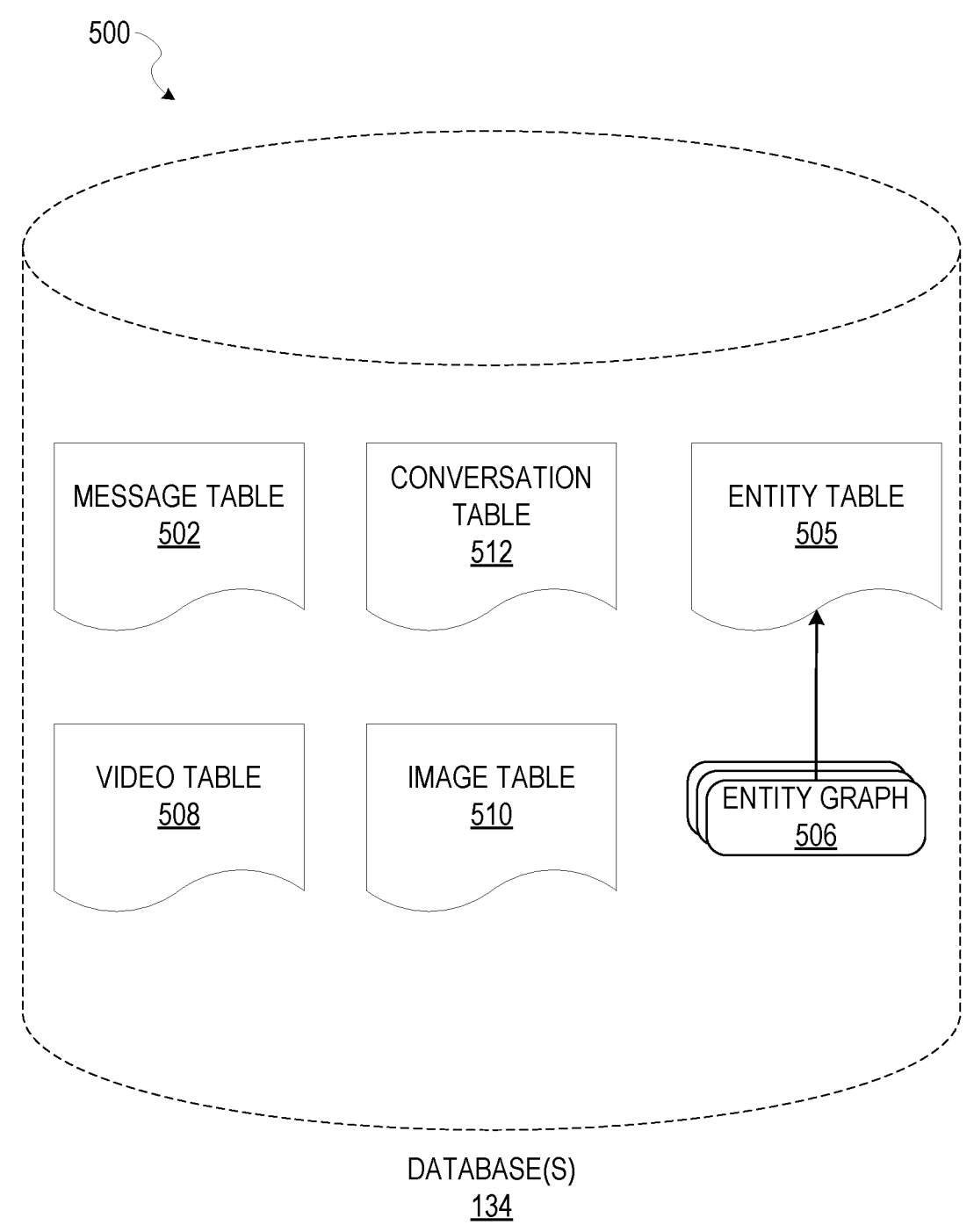
FIG. 5 is a schematic diagram illustrating data which may be stored in a database of an application server system, according to example embodiments.

FIG. 5 is a schematic diagram illustrating data 500 which may be stored in one or more of the databases 134 of the application server 130, according to certain example embodiments. While the content of the data 500 is shown to comprise a number of tables, it will be appreciated that the data 500 could be stored in other types of data structures (e.g., as an object-oriented database).

The data 500 includes message data stored within a message table 502. An entity table 505 stores entity data, including an entity graph 506. Entities for which records are maintained within the entity table 505 may include individuals, corporate entities, organizations, objects, places, events, and so forth. Each entity is provided with a unique identifier, as well as an entity type identifier (not shown).

The entity graph 506 furthermore stores information regarding relationships and associations between entities. Such relationships may be social, professional (e.g., work at a common corporation or organization), interested-based, or activity-based, merely for example.

A video table 508 stores video data associated with messages for which records are maintained within the message table 502. Similarly, an image table 510 stores image data associated with messages for which message data is stored in the message table 502.

A conversation table 512 stores data regarding chat conversations and associated content (e.g., image, video, or audio data). A record for each chat conversation may be maintained in the conversation table 512. Each record may include a unique identifier for the chat conversation, a retention duration attribute, identifiers of entities that are participants in the chat conversation (or pointers to the identifiers in the entity table 505), and message data (or pointers to corresponding message data in the message table 502).

Figure 6:
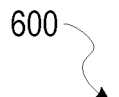
FIG. 6 is a schematic diagram illustrating a structure of a message generated by a client application of the communication system, according to example embodiments.
Figure 6:
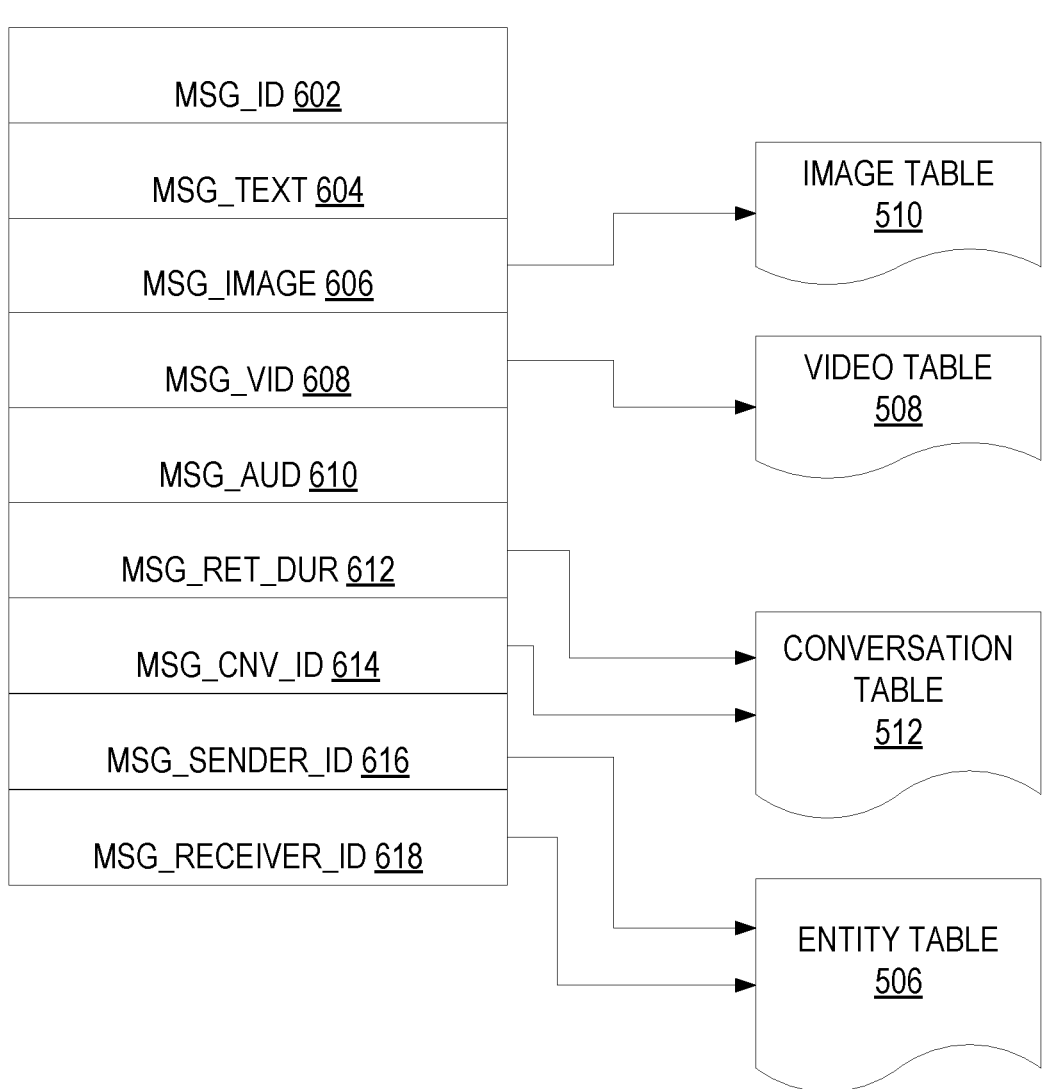

FIG. 6 is a schematic diagram illustrating a structure of a message 600, according to some embodiments, generated by a client application 112 for communication to a further client application 112 or one or more application logic modules 150. The content of a particular message 600 is used to populate the message table 502 stored within database 134, accessible by the application logic modules 150. Similarly, the content of a message 600 is stored in memory as "in-transit" or "in-flight" data of one of the client devices 110-1 or 110-2 or the application server 130. The message 600 is shown to include the following components:

A message identifier 602: a unique identifier that identifies the message 600.

A message text payload 604: text, to be generated by a user via a user interface of one of the client devices 110-1 or 110-2 and that is included in the message 600.

A message image payload 606: image data, captured by a camera component of one of the client devices 110-1 or 110-2 or retrieved from memory of one of the client devices 110-1 or 110-2, and that is included in the message 600.

A message video payload 608: video data, captured by a camera component or retrieved from a memory component of one of the client devices 110-1 or 110-2 and that is included in the message 600.

A message audio payload 610: audio data, captured by a microphone or retrieved from the memory component of one of the client devices 110-1 or 110-2, and that is included in the message 600.

A message duration attribute 612: an attribute value indicating, in seconds, the amount of time for which content of the message 600 (e.g., the message image payload 606, message video payload 608, and message audio payload 610) is to be made accessible to a user via the client application 112 upon accessing the message 600.

A conversation identifier 614: an identifier indicative of the chat conversation to which the message belongs.

A message sender identifier 616: an identifier (e.g., a messaging system identifier, email address, or device identifier) indicative of a user of one of the client devices 110-1 or 110-2 on which the message 600 was generated and from which the message 600 was sent.

A message receiver identifier 618: an identifier (e.g., a messaging system identifier, email address, or device identifier) indicative of a user of one of the client devices 110-1 and 110-2 to which the message 600 is addressed.

The contents (e.g., values) of the various components of the message 600 may be pointers to locations in tables within which content data values are stored. For example, an image value in the message image payload 606 may be a pointer to (or address of) a location within the image table 510. Similarly, values within the message video payload 608 may point to data stored within the video table 508, values stored within the conversation identifier 614 may point to data stored within the conversation table 512, and values stored within the message sender identifier 616 and the message receiver identifier 618 may point to user records stored within the entity table 505.

Figure 7:
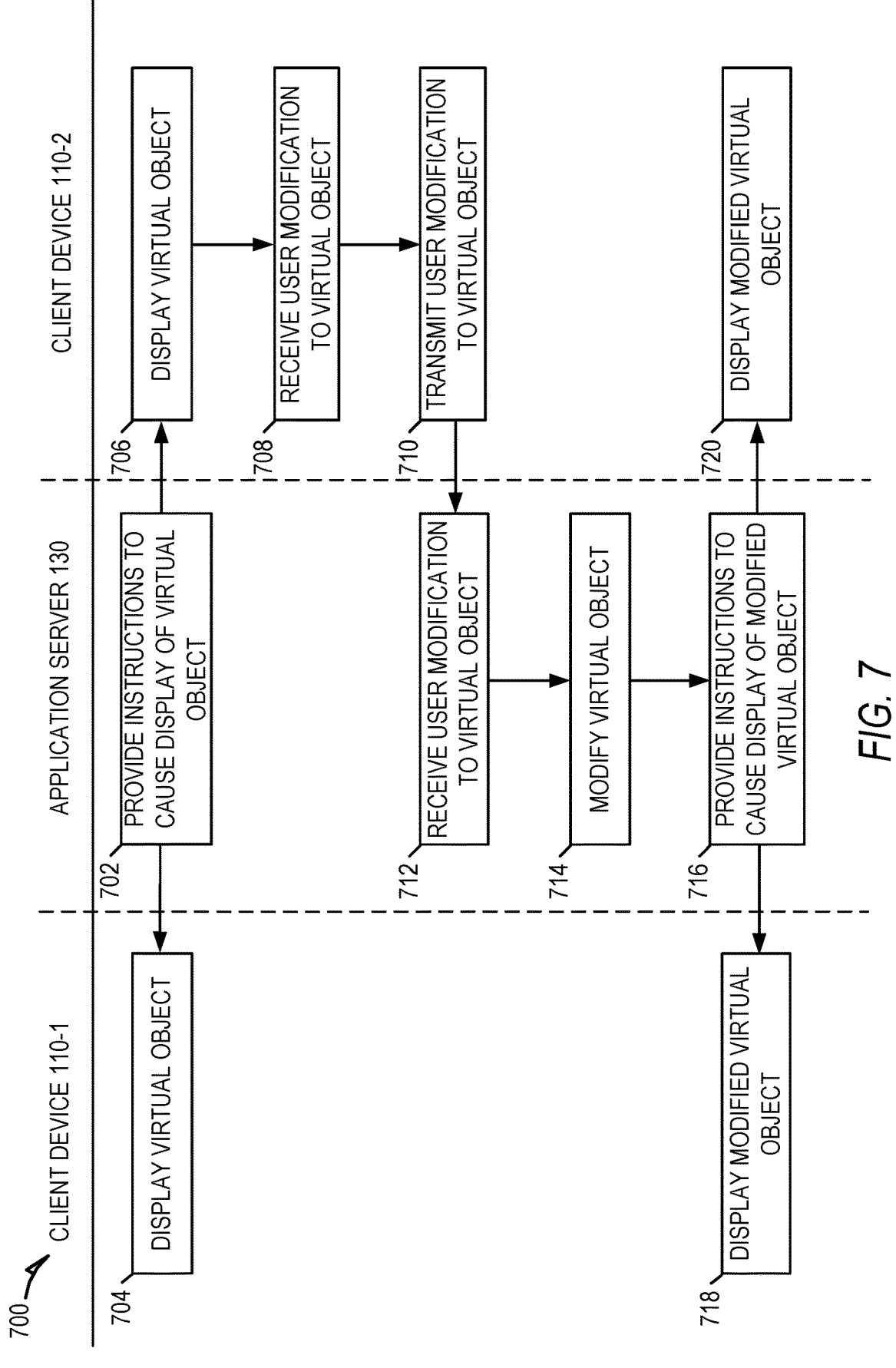
FIG. 7 is an interaction diagram illustrating example interactions between components of the communication system in facilitating shared control of a virtual object by two or more users, according to example embodiments.
Figure 8:
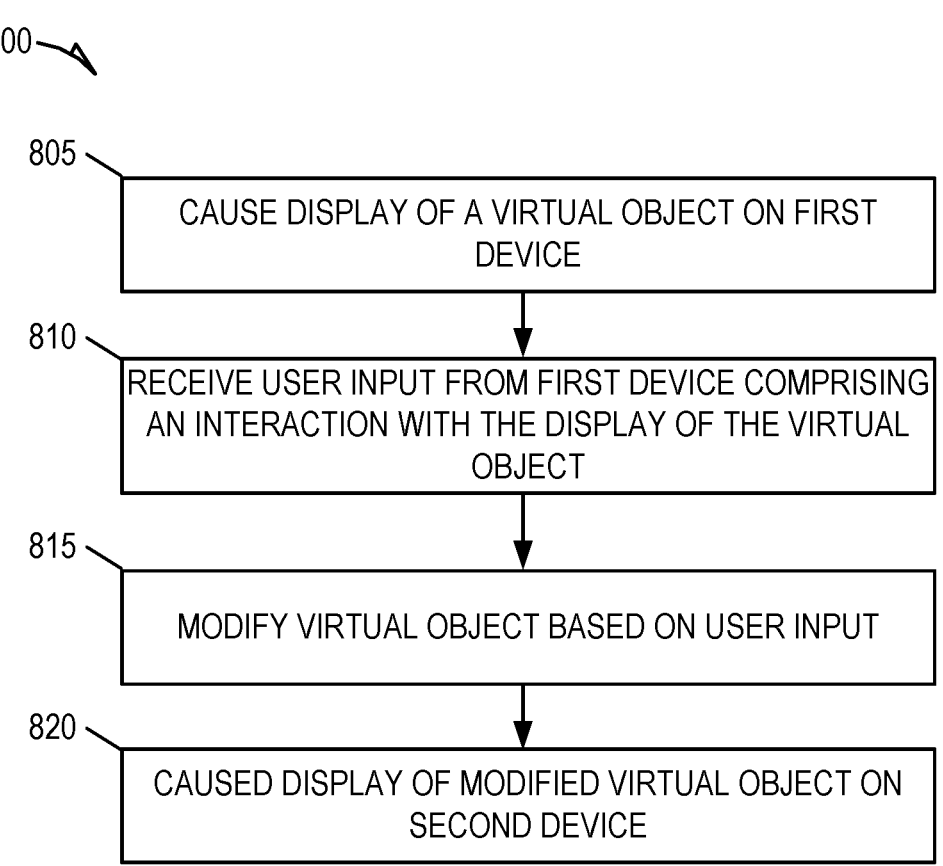
FIGS. 8-11 are flowcharts illustrating operations of the communication system in performing a method facilitating shared control of a virtual object by two or more users, according to example embodiments.

FIG. 7 is an interaction diagram illustrating example interactions between components of the communication system in performing a method 700 for facilitating shared control of a virtual object by two or more users, according to example embodiments. As shown, the method 700 begins at operation 702 where the application server 130 provides instructions to the client devices 110-1 and 110-2 that causes the devices to display a virtual object. At operation 704, the client device 110-1 displays the virtual object, and at operation 706, the client device 110-2 displays the virtual object. The virtual object may be displayed by any of the devices 110-1 and 110-2 as part of an augmented reality experience. That is, the virtual object may be displayed overlaid upon a real-world environment to make the virtual object appear as if it were actually in the real-world environment.

In some embodiments, the virtual object may be displayed as part of separate augmented reality experiences on the client devices 110-1 and 110-2. That is, the display of the virtual object by the client device 110-1 may be overlaid on a first real-world environment corresponding to a current location of the client device 110-1 while the display of the virtual object by the client device 110-2 may be overlaid on a second real-world environment corresponding to a current location of the client device 110-2.

In some embodiments, the virtual object may be displayed as part of an augmented reality experience on a first device while the display of the virtual object on the second device comprises media content that captures the augmented reality experience provided by the first device. For example, the display of the virtual object by the client device 110-1 may be overlaid on a real-world environment corresponding to a current location of the client device 110-1, and media content based on image data generated by the camera 160 may be augmented to depict the display of the virtual object overlaid on the real-world environment. Consistent with this example, the application server 130 may provide instructions to the client device 110-2 that causes the client device 110-2 to display the media content, thereby causing client device 110-2 to display the virtual object overlaid on the real-world environment.

Consistent with some embodiments, the application server 130 may provide instructions to display the virtual object based on a location of the client device 110-1 or 110-2. For example, the virtual object may be associated with a particular location such that the virtual object is displayed at the particular location. Accordingly, the application server 130 may provide instructions to one of the client devices 110-1 or 110-2 when the location of the virtual object is within the field of view of a user or a camera of the device.

At operation 708, the client device 110-2 receives user input indicative of a modification to the virtual object. In some embodiments, the user input comprises one or more interactions with the virtual object itself, while in other embodiments the user input comprises one or more interactions with one or more interface elements that are operable to make modifications to the virtual object. The client device 110-2 transmits the user modification to the virtual object to the application server 130, at operation 710.

At operation 712, the application server 130 receives the user modification to the virtual object. The application server 130 modifies the virtual object, at operation 714, based on the user modification received from the client device 110-2. For example, the application server 130 may maintain data that defines the display of the virtual object and in modifying the virtual object the application server 130 may update the data to reflect the user modification.

At operation 716, the application server 130 provides instructions to the client devices 110-1 and 110-2 that cause the devices to display the modified virtual object, and the client devices 110-1 and 110-2 display the modified virtual object at operations 718 and 720, respectively. The display of the modified virtual object may be a continuation of the augmented reality experience referenced above.

In some embodiments, prior to displaying the virtual object on the client device 110-2 and allowing a user of the client device 110-2 to modify the virtual object, a user of the client device 110-1 can establish user permissions that allows the user of the client device 110-2 to access, control, and augment virtual objects displayed by the client device 110-1. In this way, the user of the client device 110-1 can relinquish control of the view of the surrounding environment to a remote user and the remote user can augmented the view of the user of the client device 110-1 without any further action by the user of the client device 110-1.

FIGS. 8-11 are flowcharts illustrating operations of the communication system in performing a method 800 for facilitating shared control of a virtual object by two or more users, according to example embodiments. The method 800 may be embodied in computer-readable instructions for execution by one or more processors such that the operations of the method 800 may be performed in part or in whole by the functional components of the communication system 100; accordingly, the method 800 is described below by way of example with reference thereto. However, it shall be appreciated that at least some of the operations of the method 800 may be deployed on various other hardware configurations than the communication system 100.

At operation 805, the application server 130 causes display of a virtual object by a first device. The first device is associated with a first user. The virtual object may be a virtual object generated by a second user, selected from a predefined set of template objects by the second user, or generated based on one or more modifications to one the predefined template objects in the set of predefined set of template objects. The application server 130 may maintain object definition data that defines the display of the virtual object and in causing display of the virtual object, the application server 130 may provide the first device with the object definition data along with a set of instructions that causes the first device to display the virtual object in accordance with the object definition data.

The display of the virtual object on the first device may be further supported by a client application (e.g., client application 112) running on the device. For example, the client application may provide a graphical user interface (GUI) within which the virtual object may be presented.

The virtual object may be displayed as part of an augmented reality experience provided by the communication system 100. For example, in some embodiments, image data including one or more images depicting the real-world environment are augmented to present the virtual object overlaid on the real-world environment, and the application server 130 causes the first device to display the augmented image data. In some embodiments, as part of the augmented reality experience, a second user can invite or otherwise allow the first user to view and augment a virtual reality object that is presented to the second user. That is, the first user may only be enabled to view the virtual object based on one or more user permissions established by the second user.

In some embodiments, the real-world environment may be a real-world environment visible within the field of view of a camera communicatively coupled to the first device. That is, image data produced by the camera of the first device may be augmented (e.g., by the application server 130) to include the virtual object overlaid on a real-world environment depicted in the image data. In some embodiments, the camera is an embedded camera of the first device (e.g., a smartphone camera). In some embodiments, the camera is an embedded camera of a companion device (e.g., companion device 114) of the first device such as a wearable device (e.g., glasses 331).

In some embodiments, the real-world environment may be a real-world environment visible within the field of view of a camera communicatively coupled to a second device. That is, image data produced by the camera of the second device may be augmented (e.g., by the application server

130) to include the virtual object overlaid on a real-world environment depicted in the image data, and the augmented image data is provided to the first device for display. In some embodiments, the camera is an embedded camera of the second device (e.g., a smartphone camera). In some embodiments, the camera is an embedded camera of a companion device (e.g., companion device 114) of the second device such as a wearable device (e.g., glasses 331).

In some embodiments, the first device comprises a transparent display device that can be worn by the first user (e.g., a heads-up display). Consistent with these embodiments, the transparent display device displays the virtual object while allowing the first user to also view the real-world environment through the device.

In some embodiments, the application server 130 may cause the first device to display the virtual object based on a current location of the first device. For example, the object definition data may specify a particular geo-location for the virtual object and the application server 130 may cause the first device to display the virtual object when the particular geo-location is within a field of view of the first user or the camera communicatively coupled to the first device. At operation 810, the application server 130 receives, from the first device, user input indicative of a modification to the virtual object. The modification to the virtual object may, for example, comprise any one or more of: a change to a size of the virtual object, a change to a shape of the virtual object, a change to a location of the virtual object, a change to a color of the virtual object, a change to an orientation of the virtual object, or a change to an animation state of the virtual object.

In some embodiments, the user input may comprise one or more interactions with the display of the virtual object. For example, the first user may interact with the display of the virtual object by the first device using gestures such as a pinching, spreading, pressing or dragging the virtual object. In embodiments in which the virtual object is displayed on a touch screen of the first device, the gestures correspond to conventional touch-screen gestures.

In some embodiments, the user input may comprise one or more interactions with a separate GUI element configured for modifying a virtual object. In a first example, one or more buttons or other such elements may allow the user to change aspects of the virtual object such as size, color, shape, location, orientation, or animation state. In a second example, the GUI provided by the client application executing on the first device provides a map element that displays a current location of the virtual object that allows the first user to change a location of the virtual object, for example, by dragging or otherwise placing a marker corresponding to the virtual object to a desired geographic location on the map.

At operation 815, the application server 130 modifies the virtual object based on the user input. That is, the application server 130 modifies the virtual object in accordance with the modification indicated by the user input. The modifying of the virtual object results in a modified virtual object. Depending on the user input, the application server 130 may modify the virtual object by performing any one or more of the following: changing a size of the virtual object; changing a shape of the virtual object; changing a location of the virtual object within the real-world environment; changing a color of the virtual object; changing an orientation of the virtual object; changing an animation state of the virtual object. Consistent with some embodiments, in modifying the virtual object, the application server 130 may cause the virtual object to change from a first state to a second state, where the second state corresponds to the modified virtual object To effectuate the modification to the virtual object, the application server 130 may update object definition data defining the virtual object. For example, the object definition data may include one or more object attributes and the application server 130 may update one or more attribute values to effectuate one or more changes to the virtual object in accordance with the user modification.

At operation 820, the application server 130 causes display, on a second device, of the modified virtual object overlaid on a real-world environment. For example, the application server 130 may provide the second device with updated object definition data along with instructions to display the modified virtual object in accordance with the updated object definition data.

In some embodiments, the application server 130 may work in conjunction with a client application executing on the second device to augment image data comprising one or more images of the real-world environment to include the modified virtual object overlaid on the real-world environment. In some embodiments, the one or more images are generated by an embedded camera of the second device (e.g., a smartphone camera). In some embodiments, the one or more images are generated by an embedded camera of a companion device (e.g., companion device 114) such as a wearable device (e.g., glasses 331).

As noted above, in some embodiments, prior to displaying the virtual object on the first device and allowing the first user to modify the virtual object, the second user can establish user permissions that allows the first user to access, control, and augment virtual objects displayed by the second device. In this way, the second user can relinquish control of the view of their surrounding environment to the first user to allow the first user to augment the view of the second user without further action by the second user.

Figure 9:
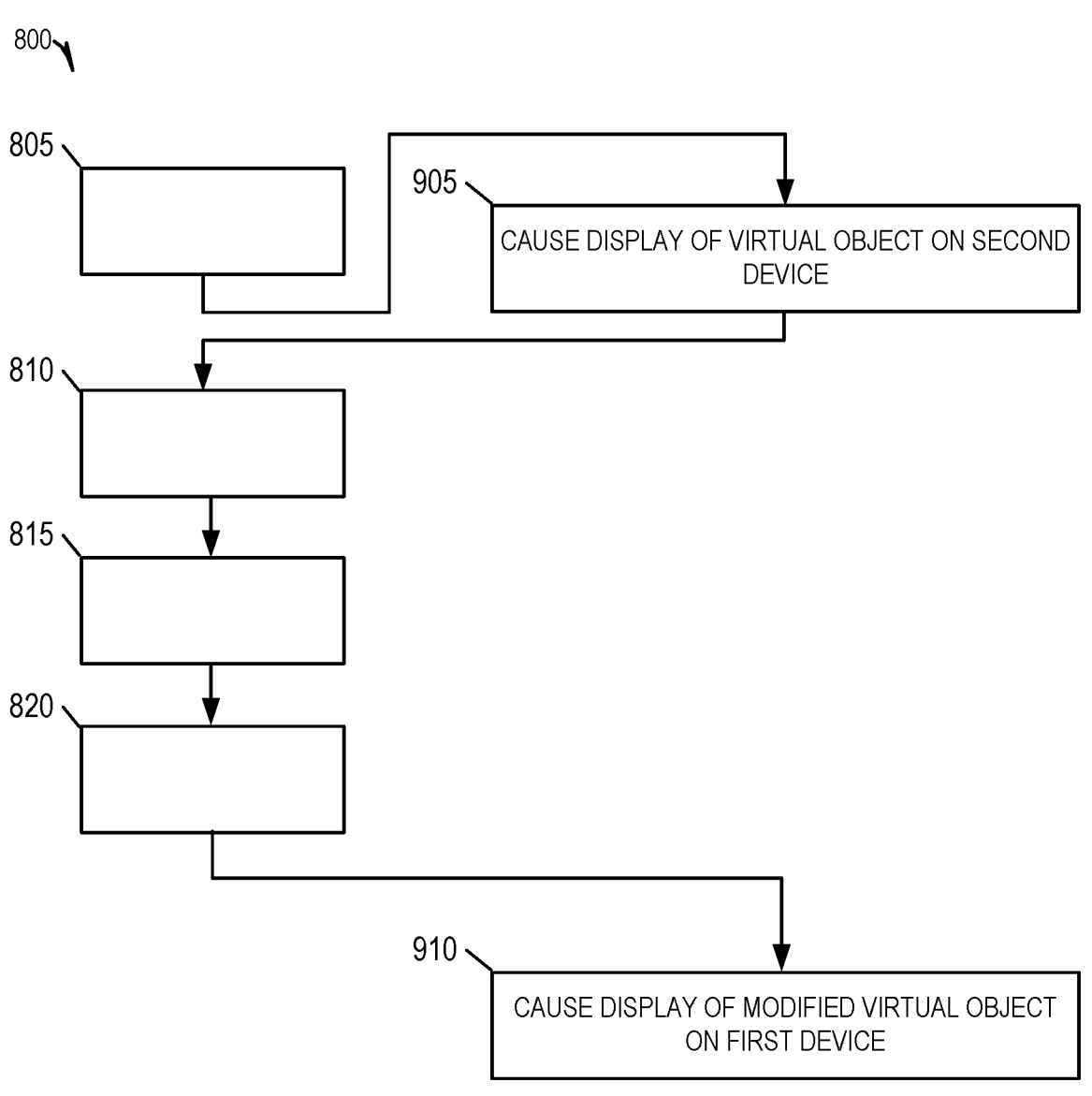

As shown in FIG. 9, the method 800 may further include operations 905 and 910, in some embodiments. Consistent with these embodiments, the operation 905 may be performed prior to operation 810 where the application server 130 receives the user input. That is, the operation 905 may be performed prior to, in parallel with, or subsequent to operation 805 but before operation 810. At operation 905, the application server 130 causes display of the virtual object on the second device.

The operation 910 may be performed subsequent to operation 815 where the application server 130 modifies the virtual object based on the user input. That is, the operation 910 may be performed prior to, in parallel with, or subsequent to operation 820 where the application server 130 causes display of the modified virtual object by the second device. At operation 910, the application server 130 causes display of the modified virtual object by the first device.

Figure 10:
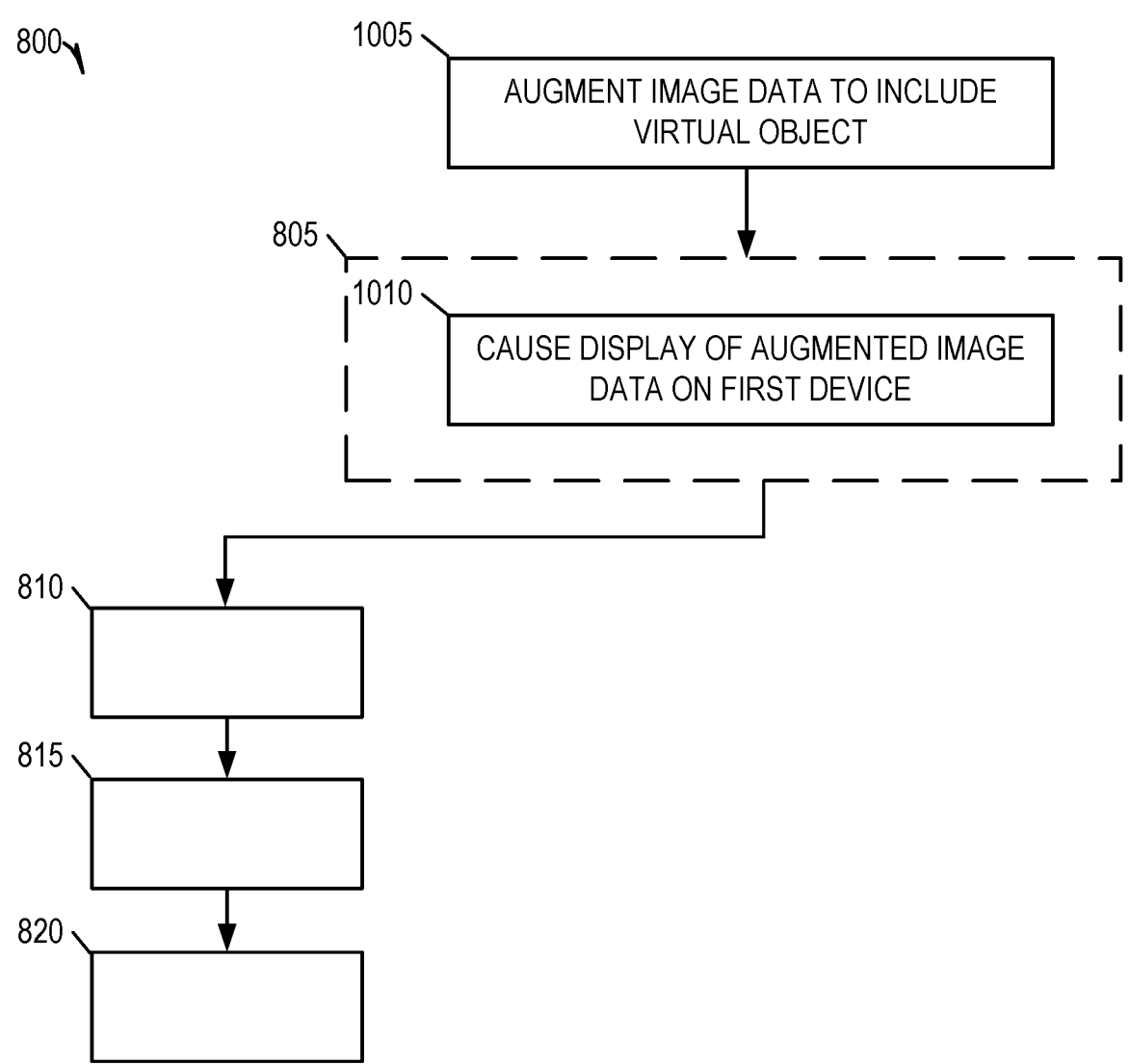

As shown in FIG. 10, the method 800 may, in some embodiments, include operations 1005 and 1010. Consistent with these embodiments, the operation 1005 may be performed prior to operation 805, where the application server 130 causes display of the virtual object on the first device. The image data includes one or more images of the real-world environment, and upon augmenting the image data, the virtual object is presented as an overlay on the real-world environment. The image data is generated by a camera in communication with the second device.

Consistent with these embodiments, the operation 1010 is performed as part of (e.g., as a sub-routine or sub-operation) operation 805 where the application server 130 causes display of the virtual object by the first device. At operation 1010, the application server 130 causes the first device to display the augmented image data. That is, the application server 130 causes the first device to display one or more images of the real-world environment with the virtual object overlaid thereon.

Figure 11:
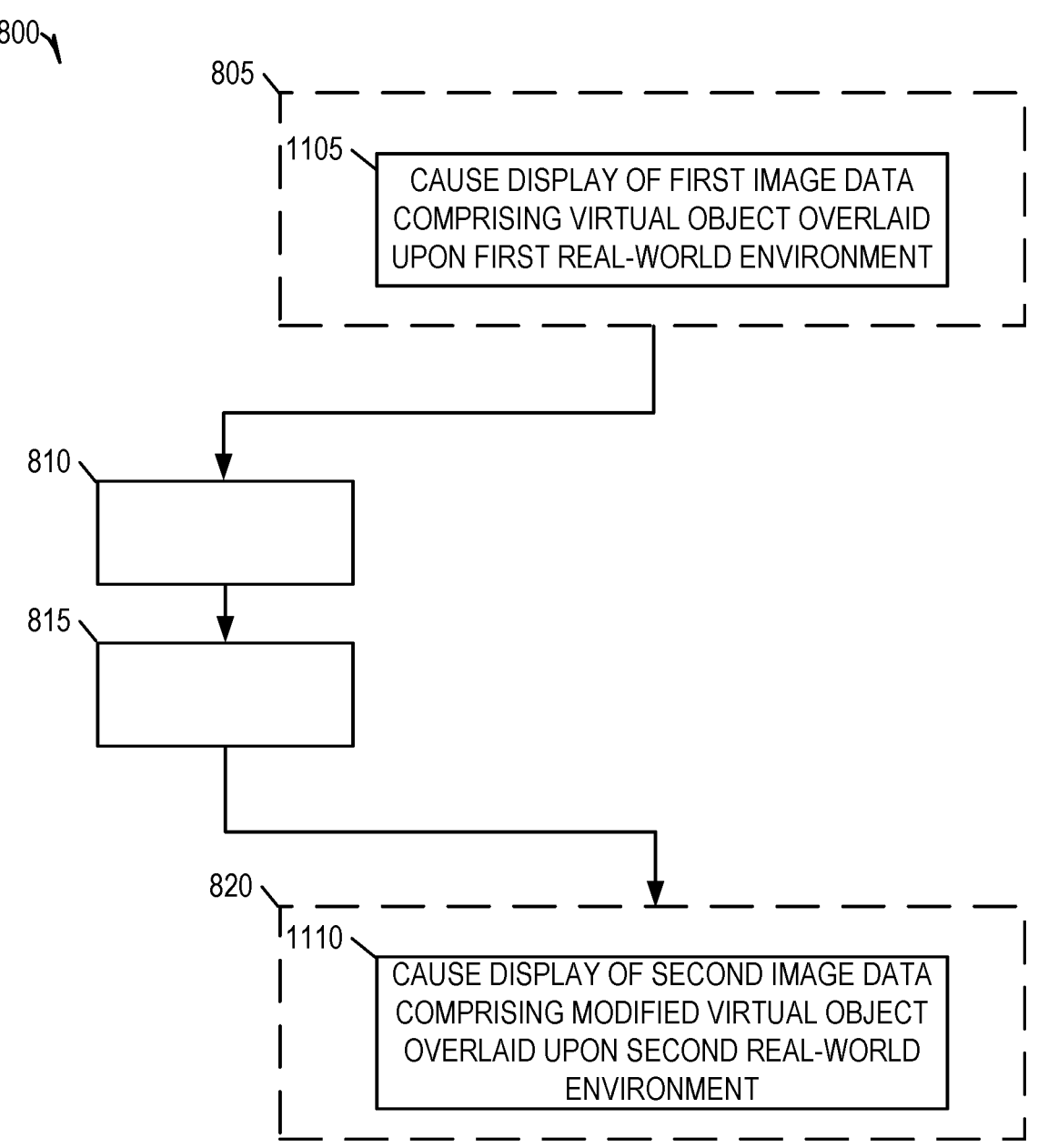

As shown in FIG. 11, the method 800 may, in some embodiments, include operations 1105 and 1110. The operation 1105 may be performed as part of the operation 805 where the application server 130 causes display of the virtual object by the first device. At operation 1105, the application server 130 causes the first device to display first image data depicting the virtual object overlaid upon a first real-world environment.

The operation 1110 may be performed as part of the operation 820 where the application server 130 causes display of the modified virtual object by the second device. With reference to the operation 820, in the context of FIG. 11, the real-world environment is a second real-world environment. At operation 1110, the application server 130 causes the second device to display second image data depicting the modified virtual object overlaid upon the second real-world environment.

Software Architecture

Figure 12:
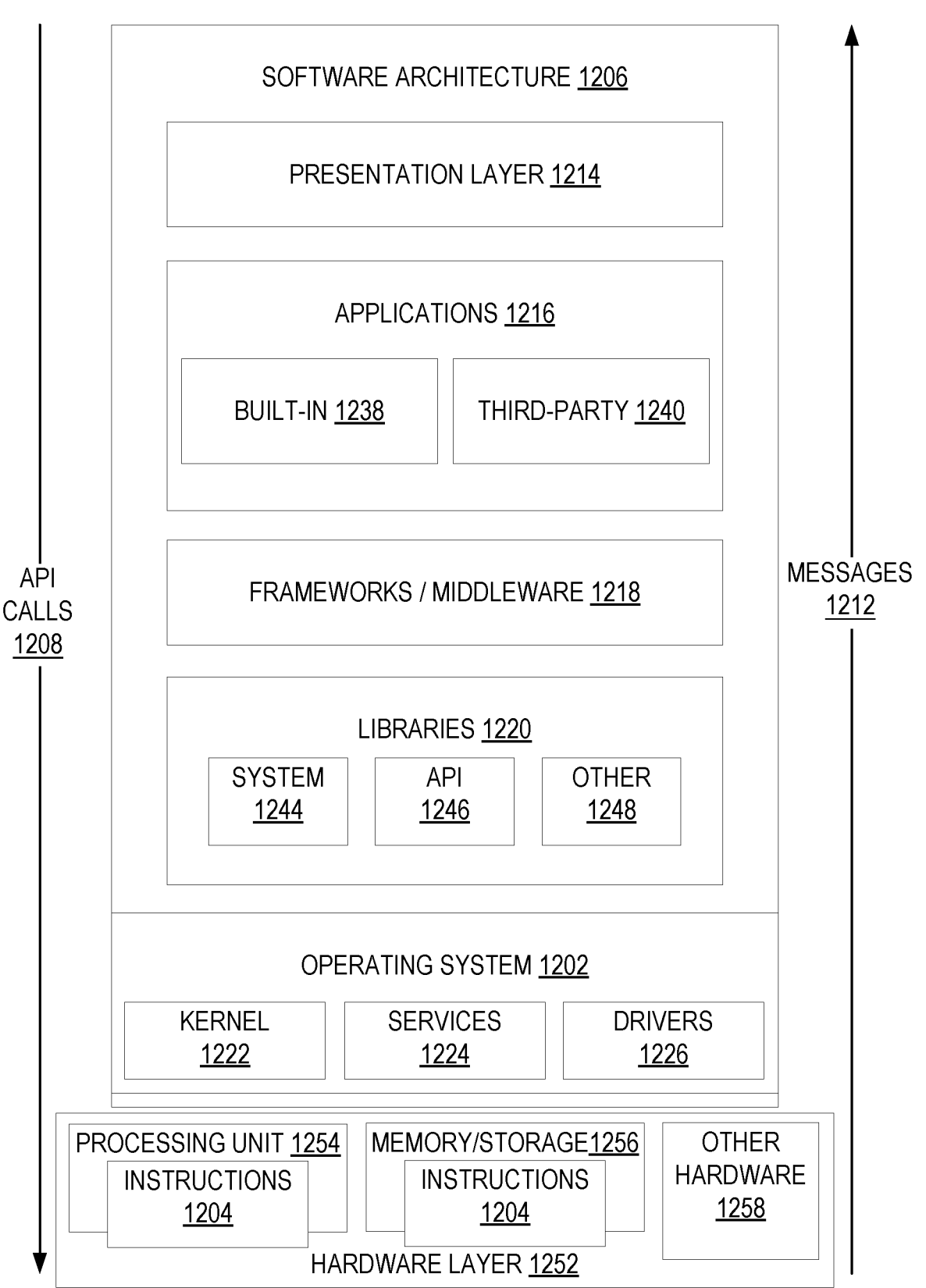
FIG. 12 is a block diagram illustrating a representative software architecture, which may be used in conjunction with various hardware architectures herein described, according to example embodiments.

FIG. 12 is a block diagram illustrating an example software architecture 1206, which may be used in conjunction with various hardware architectures herein described. FIG. 12 is a non-limiting example of a software architecture, and it will be appreciated that many other architectures may be implemented to facilitate the functionality described herein. The software architecture 1206 may execute on hardware such as a machine 1300 of FIG. 13 that includes, among other things, processors 1304, memory/storage 1306, and I/O components 1318. A representative hardware layer 1252 is illustrated and can represent, for example, the machine 1300 of FIG. 13. The representative hardware layer 1252 includes a processing unit 1254 having associated executable instructions 1204. The executable instructions 1204 represent the executable instructions of the software architecture 1206, including implementation of the methods, components, and so forth described herein. The hardware layer 1252 also includes memory and/or storage modules 1256, which also have the executable instructions 1204. The hardware layer 1252 may also comprise other hardware 1258.

In the example architecture of FIG. 12, the software architecture 1206 may be conceptualized as a stack of layers where each layer provides particular functionality. For example, the software architecture 1206 may include layers such as an operating system 1202, libraries 1220, frameworks/middleware 1218, applications 1216, and a presentation layer 1214. Operationally, the applications 1216 and/or other components within the layers may invoke API calls 1208 through the software stack and receive a response to the API calls 1208 as messages 1212. The layers illustrated are representative in nature and not all software architectures have all layers. For example, some mobile or special-purpose operating systems may not provide a frameworks/middleware 1218, while others may provide such a layer. Other software architectures may include additional or different layers.

The operating system 1202 may manage hardware resources and provide common services. The operating system 1202 may include, for example, a kernel 1222, services 1224, and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1220 provide a common infrastructure that is used by the applications 1216 and/or other components and/or layers. The libraries 1220 provide functionality that allows other software components to perform tasks in an easier fashion than by interfacing directly with the underlying operating system 1202 functionality (e.g., kernel 1222, services 1224, and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media formats such as MPEG4, H.294, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1218 provide a higher-level common infrastructure that may be used by the applications 1216 and/or other software components/modules. For example, the frameworks/middleware 1218 may provide various GUI functions, high-level resource management, high-level location services, and so forth. The frameworks/ middleware 1218 may provide a broad spectrum of other APIs that may be utilized by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. The third-party applications 1240 may include an application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 1240 may invoke the API calls 1208 provided by the mobile operating system (such as the operating system 1202) to facilitate functionality described herein.

The applications 1216 may use built-in operating system functions (e.g., kernel 1222, services 1224, and/or drivers 1226), libraries 1220, and frameworks/middleware 1218 to create user interfaces to interact with users of the system. Alternatively, or additionally, in some systems interactions with a user may occur through a presentation layer, such as the presentation layer 1214. In these systems, the application/component "logic" can be separated from the aspects of the application/component that interact with a user.

Figure 13:
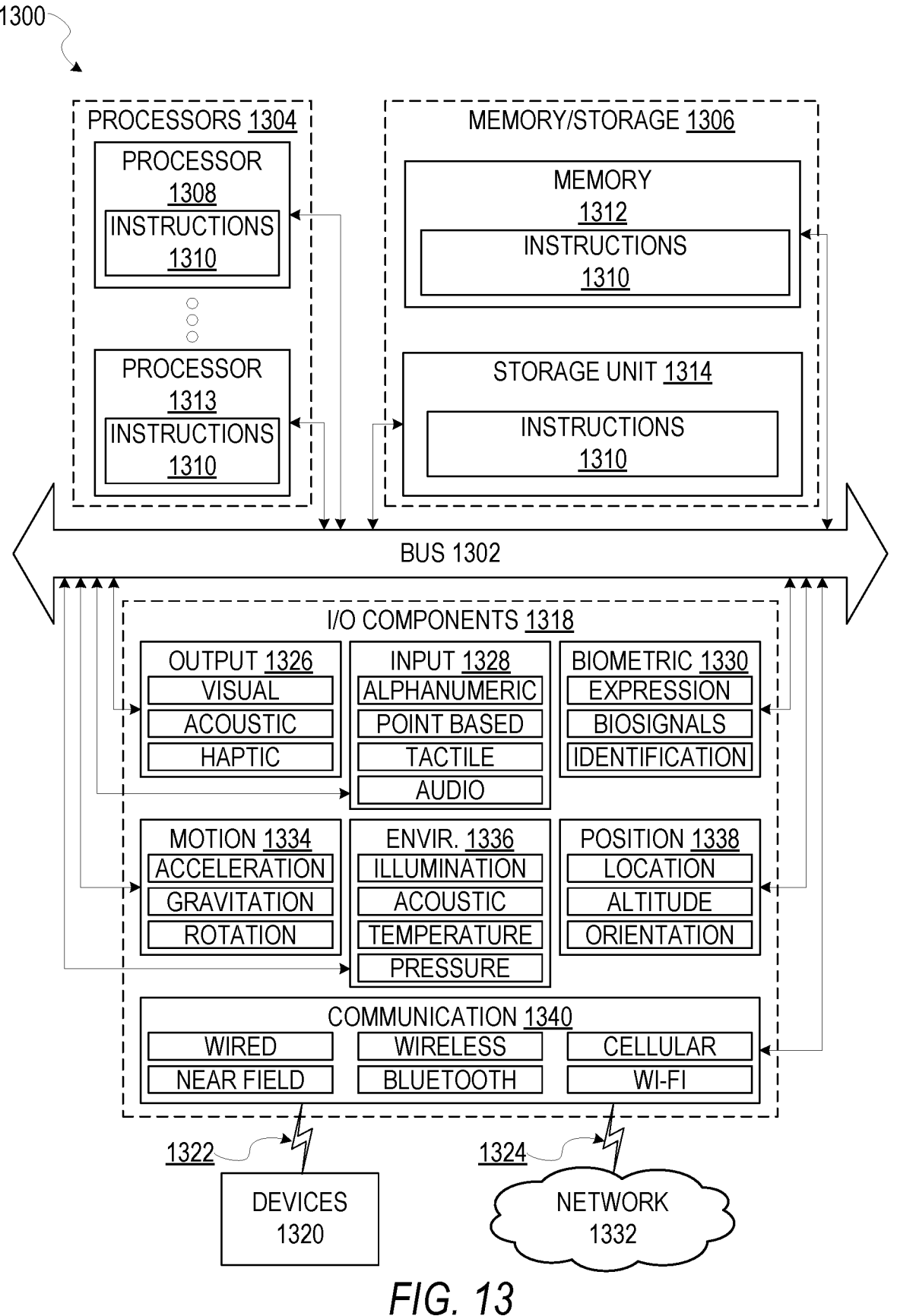
FIG. 13 is a block diagram illustrating components of a machine able to read instructions from a machine-readable medium (e.g., a machine-readable storage medium) and perform any one or more of the methodologies discussed herein, according to example embodiments.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1310 (e.g., software, a program, an application, an applet, an app, or other executable code) for causing the machine 1300 to perform any one or more of the methodologies discussed herein may be executed. As such, the instructions 1310 may be used to implement modules or components described herein. The instructions 1310 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1310, sequentially or otherwise, that specify actions to be taken by the machine 1300. Further, while only a single machine 1300 is illustrated, the term "machine" shall also be taken to include a collection of machines that individually or jointly execute the instructions 1310 to perform any one or more of the methodologies discussed herein.

The machine 1300 may include processors 1304, memory/storage 1306, and I/O components 1318, which may be configured to communicate with each other such as via a bus 1302. In an example embodiment, the processors 1304 (e.g., a CPU, a reduced instruction set computing (RISC) processor, a complex instruction set computing (CISC) processor, a (GPU, a digital signal processor (DSP), an ASIC, a radio-frequency integrated circuit (RFIC), another processor, or any suitable combination thereof) may include, for example, a processor 1308 and a processor 1312 that may execute the instructions 1310. Although FIG. 13 shows multiple processors 1304, the machine 1300 may include a single processor with a single core, a single processor with multiple cores (e.g., a multi-core processor), multiple processors with a single core, multiple processors with multiple cores, or any combination thereof.

The memory/storage 1306 may include a memory 1312, such as a main memory, or other memory storage, and a storage unit 1314, both accessible to the processors 1304 such as via the bus 1302. The storage unit 1314 and memory 1312 store the instructions 1310 embodying any one or more of the methodologies or functions described herein. The instructions 1310 may also reside, completely or partially, within the memory 1312, within the storage unit 1314, within at least one of the processors 1304 (e.g., within the processor's cache memory), or any suitable combination thereof, during execution thereof by the machine 1300.

Accordingly, the memory 1312, the storage unit 1314, and the memory of the processors 1304 are examples of machine-readable media.

The I/O components 1318 may include a wide variety of components to receive input, provide output, produce output, transmit information, exchange information, capture measurements, and so on. The specific I/O components 1318 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1318 may include many other components that are not shown in FIG. 13. The I/O components 1318 are grouped according to functionality merely for simplifying the following discussion, and the grouping is in no way limiting. In various example embodiments, the I/O components 1318 may include output components 1326 and input components 1328. The output components 1326 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen display configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen display that provides location and/or force of touches or touch gestures, or other tactile input components), audio input components (e.g., a microphone), and the like.

In further example embodiments, the I/O components 1318 may include biometric components 1330, motion components 1334, environment components 1336, or position components 1338, among a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1334 may include acceleration sensor components (e.g., accelerometer), gravitation sensor components, rotation sensor components (e.g., gyroscope), and so forth. The environment components 1336 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1338 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1318 may include communication components 1340 operable to couple the machine 1300 to a network 1332 or devices 1320 via a coupling 1324 and a coupling 1322, respectively. For example, the communication components 1340 may include a network interface component or other suitable device to interface with the network 1332. In further examples, the communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1320 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4114, Ultra Code, UCC RSS-2D bar code, and other optical codes), or acoustic detection components (e.g., microphones to identify tagged audio signals). In addition, a variety of information may be derived via the communication components 1340, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by a machine, and includes digital or analog communications signals or other intangible media to facilitate communication of such instructions. Instructions may be transmitted or received over a network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling to the network may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"MACHINE-READABLE MEDIUM" in this context refers to a component, device, or other tangible medium able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "HARDWARE COMPONENT" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor.

Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially proces-sor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC, or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, (for example, giving date and time of day) sometimes accurate to a small fraction of a second.

What is claimed is:

1. A method comprising:
causing display, at a first device of a first user, of an initial virtual object overlaid on a first real-world environment corresponding to a current location of the first device based on a first geolocation associated with the initial virtual object;

receiving, from a second device of a second user, input indicative of a modification to the initial virtual object, the modification comprising a change from the first geolocation to a second geolocation;

determining, based on user permissions established by the first user, whether the second user is permitted to control virtual objects displayed by the first device;

based on determining that the second user is permitted to control virtual objects displayed by the first device, modifying, by one or more hardware processors, the initial virtual object based on the input received from the second device, the modifying of the initial virtual object comprising changing the initial virtual object from being associated with the first geolocation to being associated with the second geolocation;

detecting the second geolocation being within a field of view of the first user based on an updated location of the first device of the first user; and based on detecting the second geolocation being within the field of view of the first user, causing display, at the first device, of a modified virtual object overlaid on a second real-world environment corresponding to the updated location of the first device, the modified virtual object resulting from modifying the initial virtual object based on the input received from the second device.

2. The method of claim 1, further comprising:
causing display, at the second device, of the initial virtual object overlaid on the first real-world environment; and causing display, at the second device, of the modified virtual object overlaid on the second real-world environment.

3. The method of claim 1, wherein the causing display, at the first device, of the initial virtual object comprises causing display of image data augmented to include the initial virtual object overlaid on the first real-world environment, the image data comprising one or more images of the first real-world environment, the image data being generated by a camera communicatively coupled to the first device.

4. The method of claim 3, further comprising:
augmenting the image data to include the initial virtual object overlaid on the first real-world environment.

5. The method of claim 3, wherein:
the camera is embedded in a wearable device; and
the wearable device is communicatively coupled to the first device.

6. The method of claim 3, wherein the camera is embedded in the first device.

7. The method of claim 1, wherein the causing display, at the first device, of the modified virtual object comprises causing display of image data comprising the modified virtual object overlaid on the second real-world environment.

8. The method of claim 1, wherein the input indicates one or more of: a change to a size of the initial virtual object, a change to a shape of the initial virtual object, a change to a color of the initial virtual object, a change to an orientation of the initial virtual object, or a change to an animation state of the initial virtual object.

9. The method of claim 1, wherein the modifying of the initial virtual object comprises one or more of:
changing a size of the initial virtual object;
changing a shape of the initial virtual object;
changing a color of the initial virtual object;
changing an orientation of the initial virtual object; and
changing an animation state of the initial virtual object.

10. The method of claim 1, wherein:
the initial virtual object is a first virtual object;
the input further comprises a selection of a second virtual object; and
the method further comprises causing display, at the first device, of the second virtual object overlaid on the second real-world environment.

11. The method of claim 1, wherein the input comprises one or more interactions with the display of the initial virtual object.

12. The method of claim 1, wherein the input comprises one or more interactions with an interface element that enables one or more modifications to the initial virtual object.

13. The method of claim 12, wherein:
the interface element comprises a map display; and the input comprises an interaction with the map display indicative of a change to the second geolocation.

14. The method of claim 13, wherein the interaction comprises placing a marker corresponding to the initial virtual object at a position on the map display corresponding to the second geolocation.

15. A system comprising:

a memory that stores instructions; and one or more processors configured by the instructions to perform operations comprising:

causing display, at a first device of a first user, of an initial virtual object overlaid on a first real-world environment corresponding to a current location of the first device based on a first geolocation associated with the initial virtual object;

receiving, from a second device of a second user, input indicative of a modification to the initial virtual object, the modification comprising a change from the first geolocation to a second geolocation;

determining, based on user permissions established by the first user, whether the second user is permitted to control virtual objects displayed by the first device;

based on determining that the second user is permitted to control virtual objects displayed by the first device, modifying, by one or more hardware processors, the initial virtual object based on the input received from the second device, the modifying of the initial virtual object comprising changing the initial virtual object from being associated with the first geolocation to being associated with the second geolocation;

detecting the second geolocation being within a field of view of the first user based on an updated location of the first device of the first user; and based on detecting the second geolocation being within the field of view of the first user, causing display, at the first device, of a modified virtual object overlaid on a second real-world environment corresponding to the updated location of the first device, the modified virtual object resulting from modifying the initial virtual object based on the input received from the second device.

16. The system of claim 15, wherein the operations further comprise:

causing display, at the second device, of the initial virtual object overlaid on the first real-world environment; and causing display, at the second device, of the modified virtual object overlaid on the second real-world environment.

17. The system of claim 15, wherein the causing display, at the first device, of the initial virtual object comprises causing display of image data augmented to include the initial virtual object overlaid on the first real-world environment, the image data comprising one or more images of the first real-world environment, the image data being generated by a camera communicatively coupled to the first device.

18. The system of claim 15, wherein the causing display, at the first device, of the modified virtual object comprises causing display of image data comprising the modified virtual object overlaid on the second real-world environment.

19. The system of claim 15, wherein the modifying of the initial virtual object comprises one or more of:

changing a size of the initial virtual object;

changing a shape of the initial virtual object;

changing a color of the initial virtual object;

changing an orientation of the initial virtual object; and changing an animation state of the initial virtual object.

20. A non-transitory computer-readable medium storing instructions that, when executed by a computer system, cause the computer system to perform operations comprising:

causing display, at a first device of a first user, of an initial virtual object overlaid on a first real-world environment corresponding to a current location of the first device based on a first geolocation associated with the initial virtual object;

receiving, from a second device of a second user, input indicative of a modification to the initial virtual object;

determining, based on user permissions established by the first user, whether the second user is permitted to control virtual objects displayed by the first device;

based on determining that the second user is permitted to control virtual objects displayed by the first device, modifying, by one or more hardware processors, the initial virtual object based on the input received from the second device, the modifying of the initial virtual object comprising changing the initial virtual object from being associated with the first geolocation to being associated with the second geolocation;

detecting the second geolocation being within a field of view of the first user based on an updated location of the first device of the first user; and based on detecting the second geolocation being within the field of view of the first user, causing display, at the first device, of a modified virtual object overlaid on a second real-world environment corresponding to the updated location of the first device, the modified virtual object resulting from modifying the initial virtual object based on the input received from the second device.

\* \* \* \* \*